United States Patent [19]

Butterfield et al.

[11] Patent Number: 4,734,756
[45] Date of Patent: Mar. 29, 1988

[54] STEREOSCOPIC TELEVISION SYSTEM

[75] Inventors: James F. Butterfield, Van Nuys; Stanton W. Alger, Monrovia; Daniel L. Symmes, Los Angeles, all of Calif.

[73] Assignee: 3-D Video Corporation, Hollywood, Calif.

[21] Appl. No.: 677,205

[22] Filed: Dec. 3, 1984

Related U.S. Application Data

[63] Continuation of Ser. No. 336,299, Dec. 31, 1981, abandoned.

[51] Int. Cl.⁴ .................. H04N 15/00; H04N 13/00
[52] U.S. Cl. ............................ 358/3; 358/88; 358/91
[58] Field of Search .................. 358/3, 88, 91, 92

[56] References Cited

U.S. PATENT DOCUMENTS

| 3,674,921 | 7/1972 | Goldsmith | 358/3 |
| 3,697,675 | 10/1972 | Beard | 358/3 |
| 4,217,602 | 8/1980 | Thomas | 358/3 |
| 4,236,172 | 11/1980 | Kransnoperov | 358/3 |

FOREIGN PATENT DOCUMENTS

| 2285037 | 5/1976 | France | 358/3 |
| 2425784 | 1/1980 | France | 358/3 |
| 899969 | 6/1962 | United Kingdom | 358/3 |

Primary Examiner—Tommy P. Chin
Attorney, Agent, or Firm—Lyon & Lyon

[57] ABSTRACT

A stereoscopic picture system which has a stereoscopic camera for picking-up a stereo-pair of images, a stereoscopic recorder, a stereoscopic encoder to selectively color each image of the stereo-pair and to superimpose them, a stereoscopic transmitter, a stereoscopic color display and a stereoscopic color viewing device. Each image of the stereo-pair in a color film system is selectively colored, or each is electronically colored in a color video system, to insure that the images are channeled separately through the color system to appear as two differently colored images at the display. Chromatic viewing devices, such as colored anaglyph glasses, are used by each viewer to channel one image to each respective eye. The viewer normally perceives a substantially black-and-white stereoscopic picture; however, a system for picking-up, recording, transmitting, reproducing, and viewing a full color picture is also described. The system relates to television, but has applications to graphic and visual displays and to film and motion pictures.

12 Claims, 21 Drawing Figures

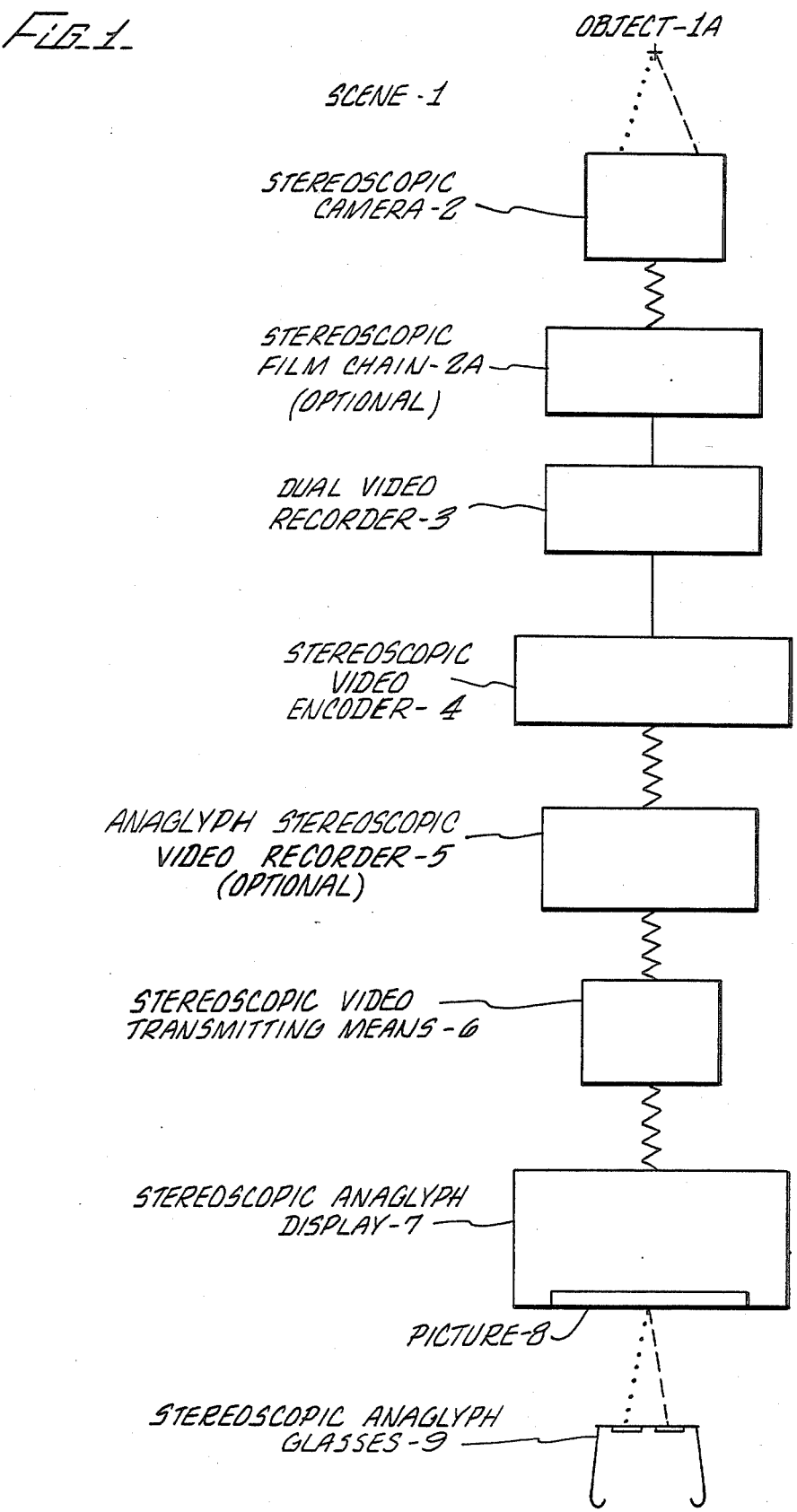

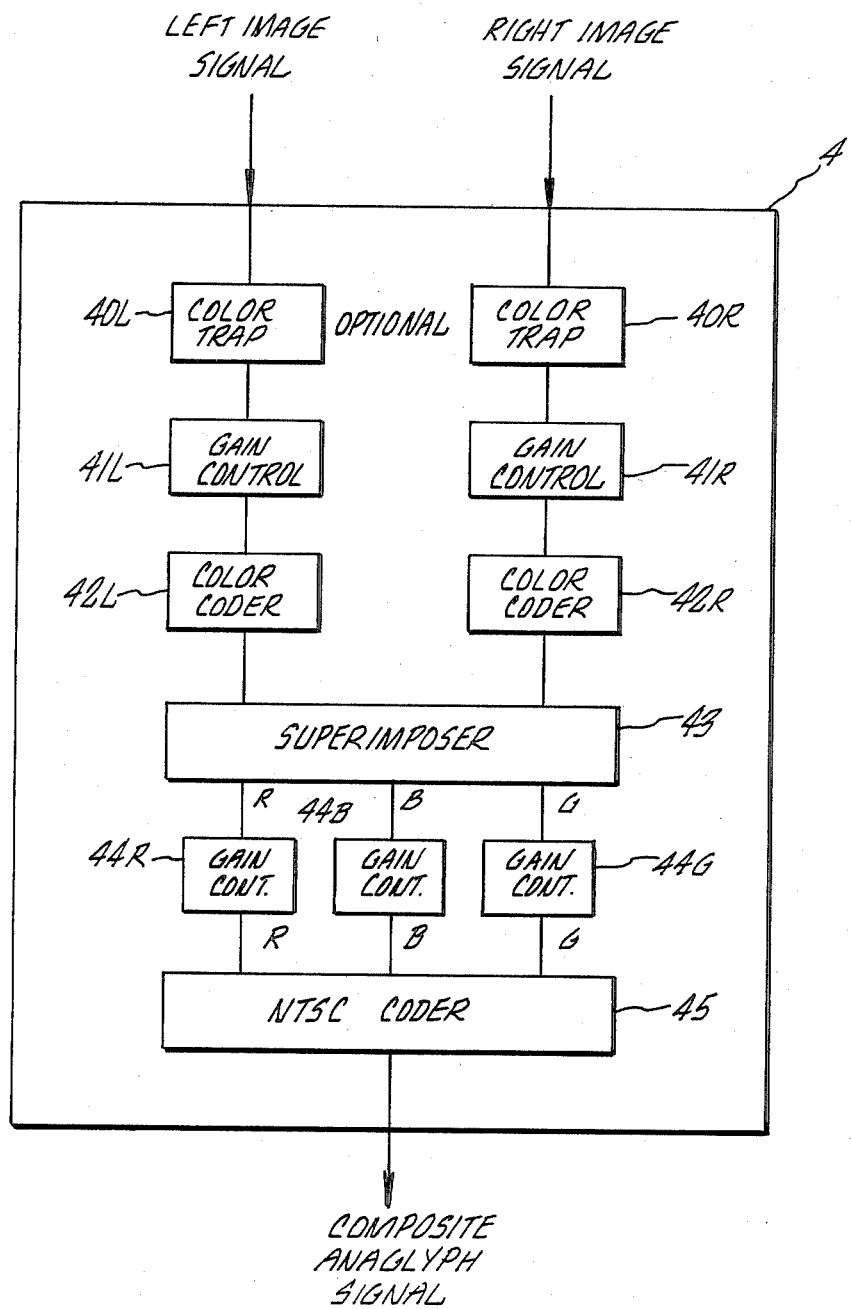
FIG_6

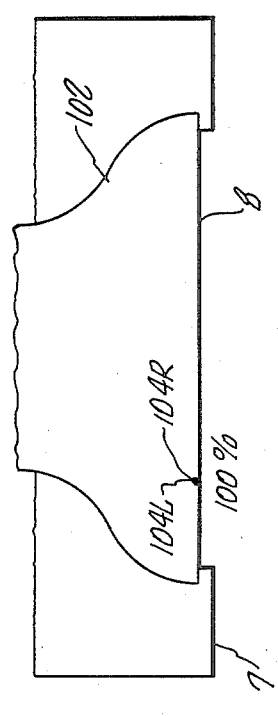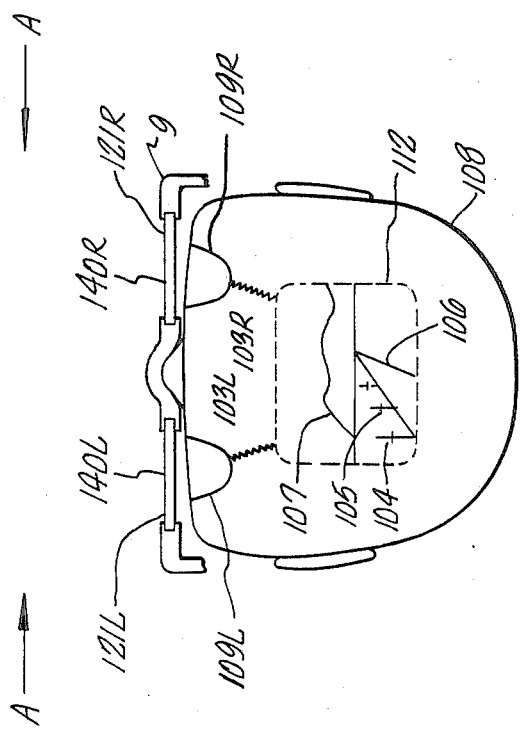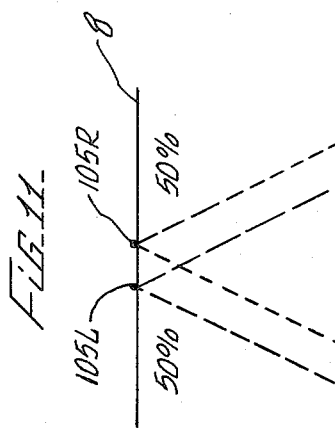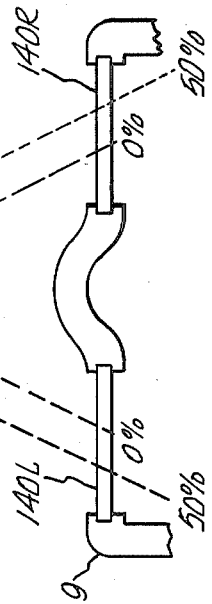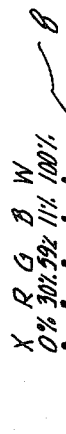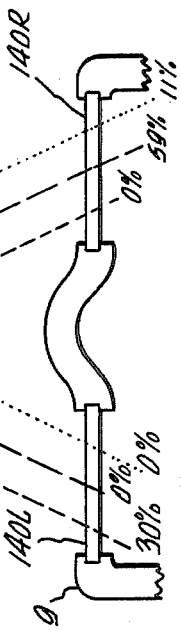
FIG. 10A.
FIG. 11.
FIG. 11A.

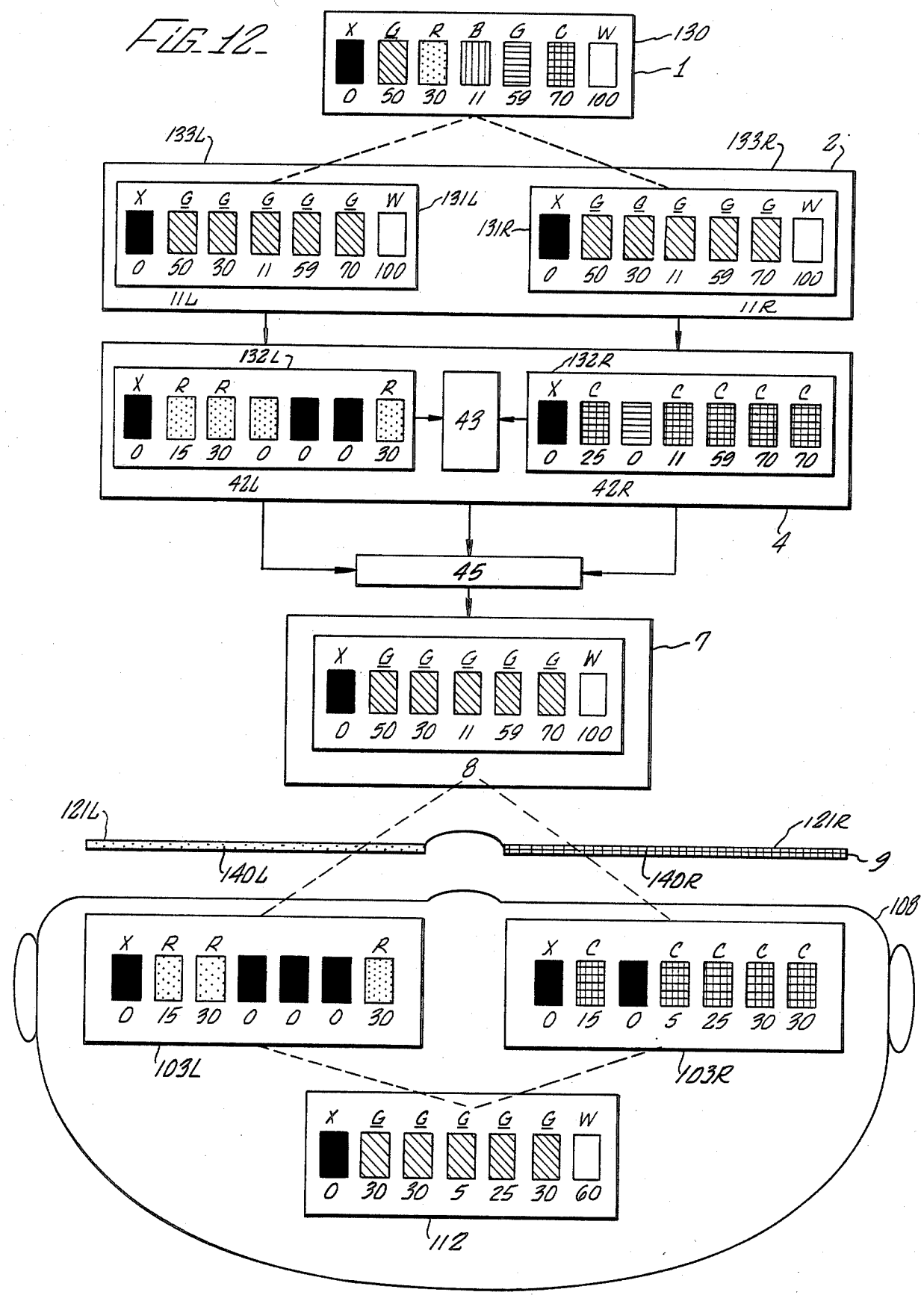

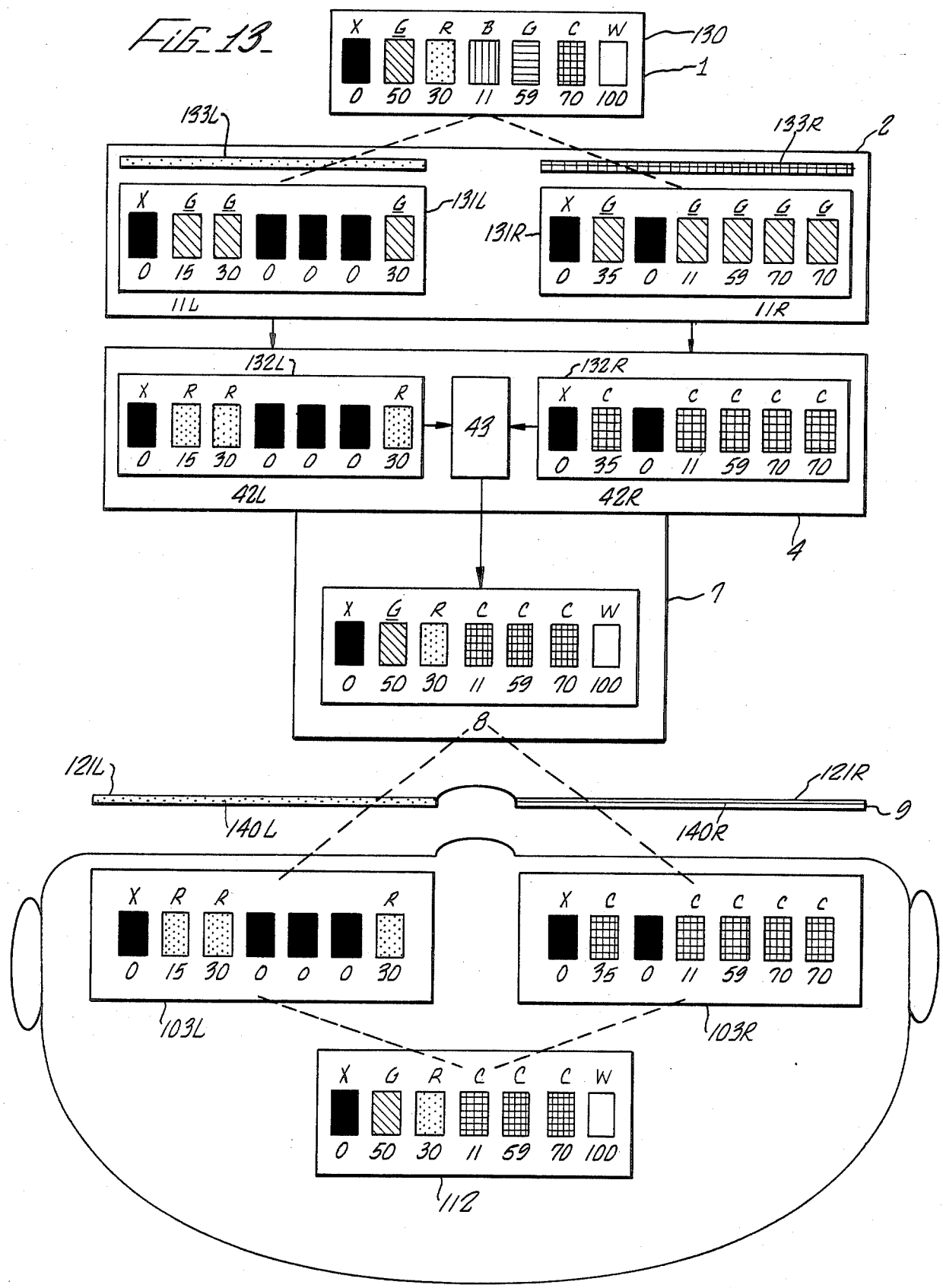

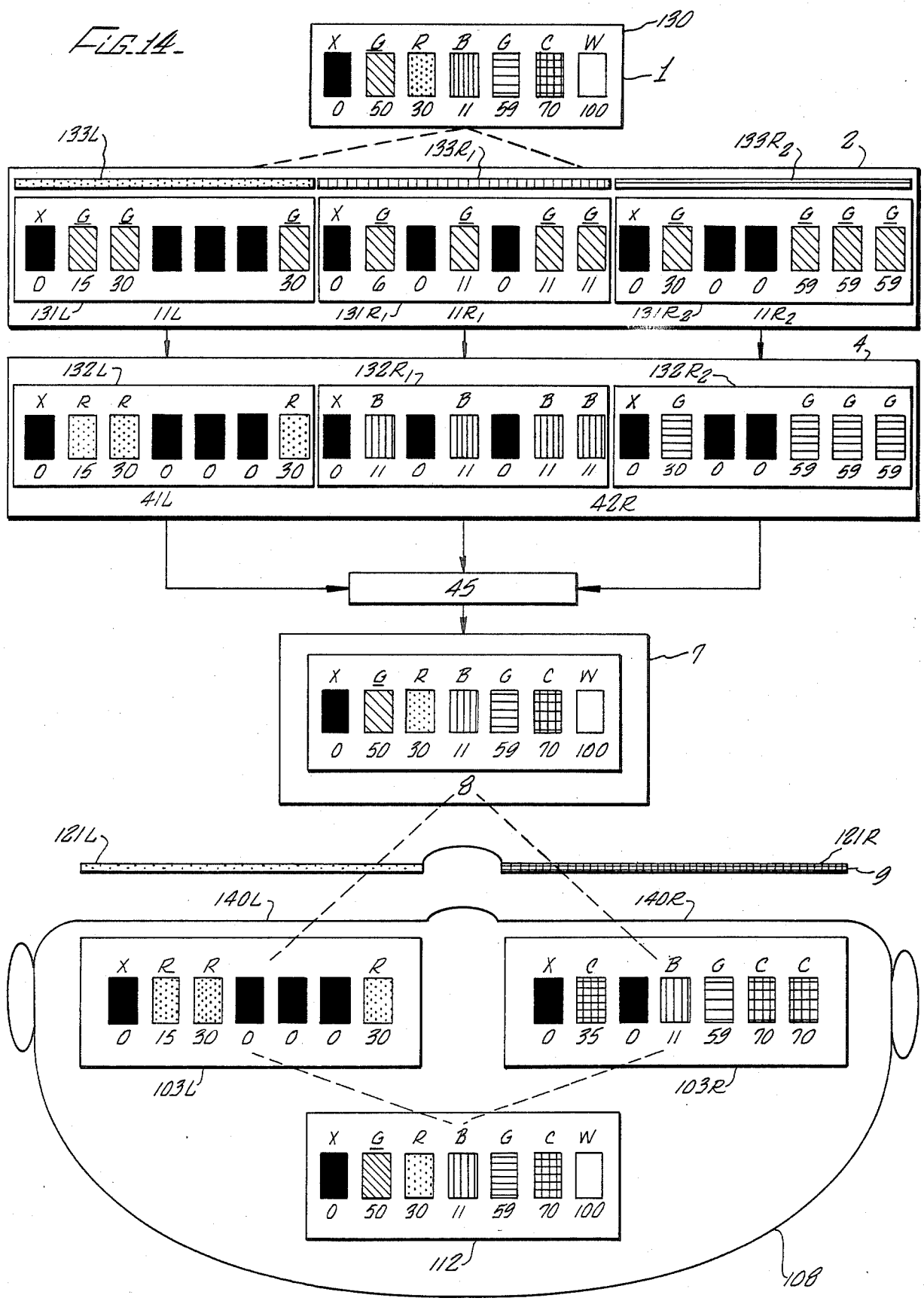

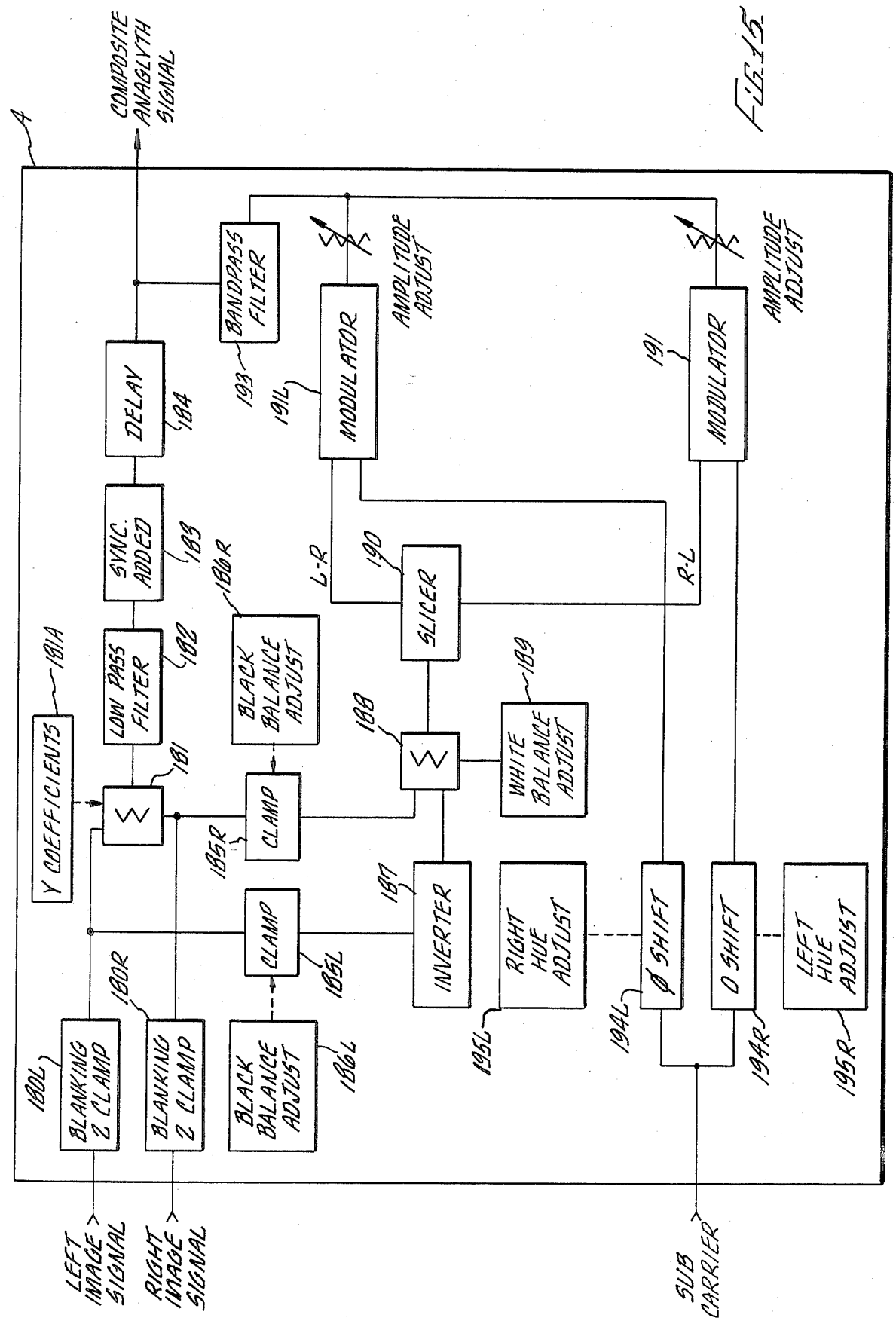

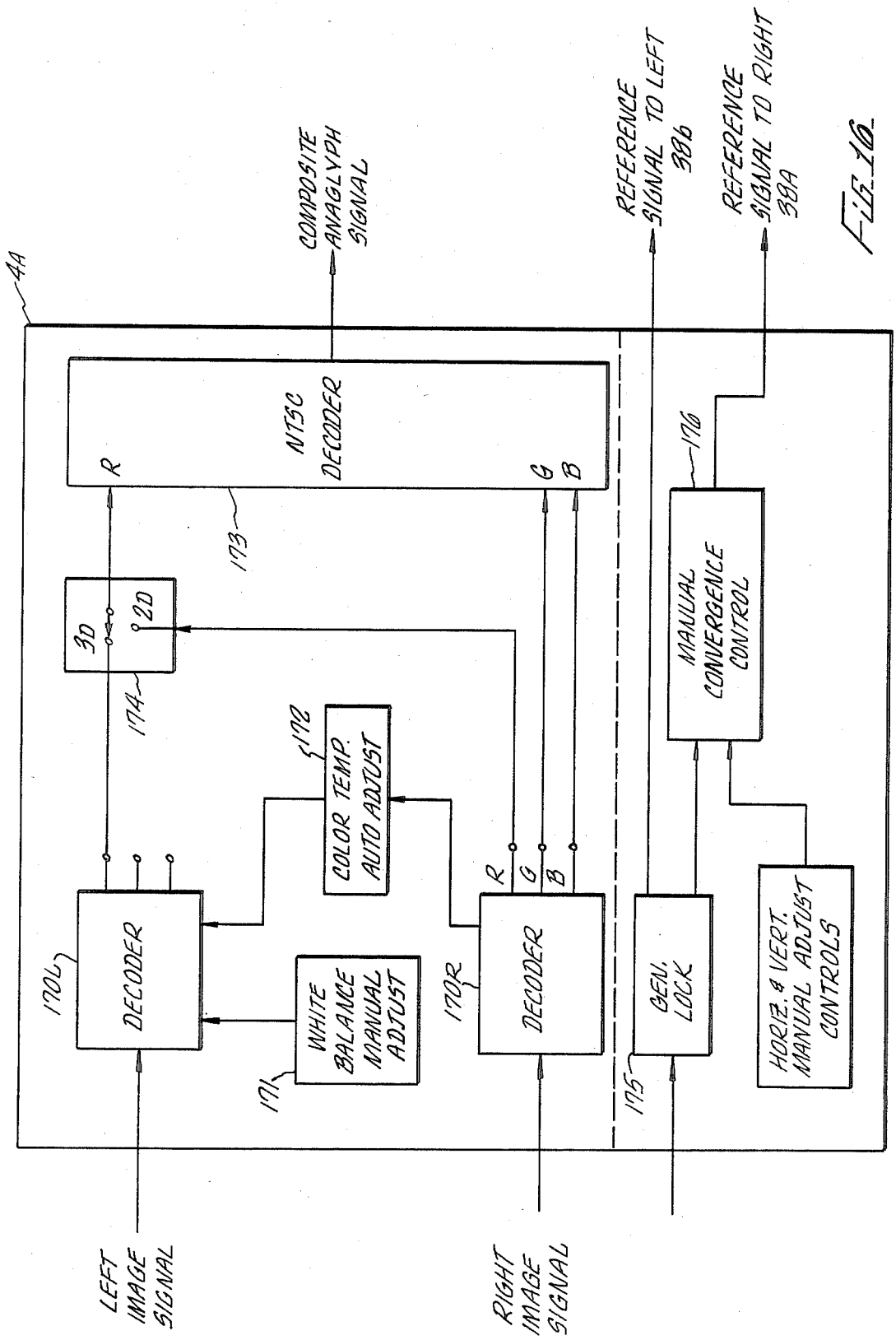

STEREOSCOPIC TELEVISION SYSTEM

This is a continuation, of application Ser. No. 336,299, filed Dec. 31, 1981, now abandoned.

BACKGROUND OF THE INVENTION

All methods of stereoscopic pick-up require that a stereo-pair of two images of a scene be picked up from two slightly different horizontal angles. At the display the two images are superimposed and one image is channeled to each respective eye of the viewer. Historically, one of the first methods of recording and displaying stereoscopic, i.e., three dimensional (3D), pictures to a group of viewers was the use of two film cameras to record the two images and two slide projectors to display the stereoscopic picture. Color coding was employed to channel the two images separately to the viewer's eyes by anaglyph (two-color) projection and with corresponding anaglyph (two-color) glasses.

For example, a black-and-white photographic slide of the left image of a recorded stereo-pair is placed in the left projector and a slide of the right image of the stereo-pair is placed in the right projector. A red filter is placed in front of the lens of the left projector and a green filter is placed in front of the lens of the right projector. The two projectors are angled so that their images superimpose on the screen.

Without glasses, the viewer sees the object of principal interest in the scene completely superimposed and it presents therefore, a nearly black-and-white picture because the intensities and hues of the red and green projectors are adjusted so the mixture produces whites and grays. Things behind the object of principal interest are not completely superimposed nor are those in front of the object of interest. This causes a color fringe of red or green to occur on the edges of these objects. Narrow objects in the background or foreground such as posts may appear separated as one red post and one green post. When the viewer places the anaglyph glasses in front of his eyes, with a red filter in the left aperture and a green filter in the right aperture, each eye sees only one image of the stereo-pair. The left eye sees the red image of the left slide through the red filter in the left aperture of the glasses. The green light from the right slide is blocked and absorbed by the red filter. The right eye sees the green image of the right slide through the green filter in the right aperature of the glasses. The red light from the left slide is blocked and absorbed by the green filter. The brain fuses the two channeled images into a single three dimensional picture which appears in all areas to be black-and-white.

Other combinations of filters may be used, such as red and blue, green and magenta (red-blue), yellow (red-green) and blue, and red and cyan (blue-green). Each combination has certain advantages and disadvantages. Generally, red and cyan have been found to be the most desirable colors for anaglyph viewing.

Another configuration is to use an enlarger stand to project the two photographic black-and-white slide images, one at a time, through a red filter for the left eye and a green filter for the right eye and record them superimposed on color film. This color film may be projected by a single projector and viewed with two-color anaglyph glasses as a black-and-white three dimensional picture.

Generally, the stereo-pair of slides use black-and-white film with the color being added artificially by filters at the display and in the glasses for color coding to thereby channel one image to each eye. Each of the two black-and-white film slides records a similar shade of gray in identical areas of the picture. However, if a red filter is used in front of one black-and-white film camera and a cyan filter in front of another, the two slides will differ in shades of gray in identical areas causing the projected picture to appear in color and in three dimensions.

That is, a reddish area of the scene may be recorded as light gray in the left slide and nearly black in the right slide appearing therefore, reddish to the viewer. A cyan area may be recorded as black in the left slide and white in the right slide. A yellow area may be recorded as medium gray in each slide. Corresponding color filters at the projector add color back in the scene. However, in this configuration blue and green are linked together as cyan and it is not possible to record, display, or view green or blue separately or in their varying shades.

SUMMARY OF THE THEORY OF THE INVENTION

The present invention in a preferred embodiment particularly pertains to a three color stereoscopic television system and method, and also is applicable to film as related below for explanatory purposes. The scene also may be recorded on black-and-white film with three cameras. One camera has a red filter on its lens representing the left eye view. The other two cameras representing the right eye view are positioned with their pick-up points optically superimposed to the right of the first camera. One of these has a green filter and the other a blue filter. After the scene is recorded, three black-and-white film images (slides or movies) are projected superimposed on a screen from three projectors, one with a red filter on the lens, another with a green filter and another with a blue filter. When the viewer wears the red-cyan glasses (red for the left eye and cyan for the right eye), the left eye sees all of the red areas in the scene and the right eye sees both blue and green areas separately and in different intensities thus providing a full (three) color picture in 3D. Without the glasses, the picture appears in full (three) colors. The color fringing on foreground and background objects is less noticeable and lost in the color of the scene; whereas, with the previously described black-and-white system the color fringes were conspicuous.

A stereo-pair of conventional color film slides may be taken with a pair of film cameras, or a single camera on a stereo slide bar or with a dual lens stereo camera. The red portion of the color spectrum is transmitted through a red filter on the lens of the camera when the left image is taken. The green portion of the spectrum is transmitted through a green filter on the camera's lens when the right image is taken. The blue image is absorbed in both the red and green filters and therefore, the three-color capability of the film is degraded and a two-color picture is seen by the viewer. However, a second right eye picture may be taken with a blue filter on the camera's lens thus providing full (three) color.

The three projectors do not require color filters in front of their lenses when color film slides are projected. Also the two (or three) color slide images can be superimposed onto one color slide in an enlarger and projected with a single projector without the need of color filters.

Certain psychological and physiological problems have been encountered with the use of colored anaglyph glasses. These are largely due to one eye seeing its complete field of view through a highly saturated color filter and the other eye seeing its complete field of view through a different highly saturated color filter. Some viewers report color rivalry wherein the entire picture seems to go red for a while and then become cyan. This causes a mental color bombardment, which is annoying, and in some viewers can cause serious distress. The use of the anaglyph glasses in a darkened theatre is sometimes more satisfactory than the use of such glasses in a more brilliantly lit TV room. In the latter case, the viewer has difficulty in looking around the room because each eye sees a different colored view of the same area.

BRIEF DESCRIPTION OF THE INVENTION

This invention is a system of stereoscopic (3D, i.e. three dimensional) television applicable primarily to home entertainment television, but also is useful for industrial closed-circuit television and for film. The system includes (1) stereoscopic means associated with a camera for picking-up a three dimensional picture of a scene represented by a stereo-pair of images, (2) stereoscopic recording means of film, video disc, or video tape, (3) stereoscopic encoder means to selectively filter the colors of each image or to color each image of the stereo-pair and superimpose them, (4) stereoscopic transmission means, (5) stereoscopic color anaglyph display means such as the CRT of a television receiver or TV or film projection on a screen, and (6) stereoscopic color anaglyph viewing means.

A stereoscopic film camera or television camera may be used as the pick-up means. Some 3D motion picture camera systems employ two film cameras on a common mount or in a single housing to pick up a stereo-pair of left and right images of the scene from slightly different angles, which are recorded on two strips of film. Other 3D motion picture systems use a stereooptical device on a single camera to pick-up and record the two images on a single strip of film. In the latter film systems, the two images may be spatially multiplexed, temporally multiplexed, or color multiplexed. In spatial multiplexing the two images are optically positioned side-by-side or over-and-under. In temporal multiplexed film systems the two images are picked-up in a time sequence—first one eye image and then the other eye image. In color multiplexed film systems, each image of the stereo-pair picked up is recorded as a different color (i.e., a color anaglyph stereoscopic system). The processed film is placed in a film chain including a motion picture projector and a television camera to electronically pick up first one of the images and then the other image from the film. Two synchronized and interlocked film chains are sometimes used with two film strips for simultaneous pick-up.

A 3D television camera may be used to pick up the two images of the scene taken from slightly different angeles (corresponding to the left and right eye views). The 3D television camera housing may contain two individual camera heads (one for each image) or it may have a single TV camera head with special optics or electronics. In the latter case the images are electronically or optically multiplexed (spatially, temporally, or by color).

Magnetic recording means can be used to store the stereo-pair of television images on video disc or video tape. If two TV cameras are used, one image can be recorded on each one of two magnetic recording means. Furthermore, the two images may be multiplexed on a single magnetic recording means in a field or frame sequential manner (one image recorded on one field, another image recorded on the next field).

A stereoscopic video encoder is employed with two input channels one for the left image and the other for the right image. This device has a single channel broadcast standard encoded (NTSC, PAL, or SECAM) output. The two input signals are electronically color coded (each in a different color), and superimposed. The two inputs may come from a dual channel system such as two TV camera heads in a 3D television camera or from two TV cameras each in a separate film chain. Also, the two inputs may come from a single channel system such as two combinations of the R, G and B (red, green and blue) outputs of a single color TV camera with a special stereoscopic lens used alone or used in a film chain. Also, the two inputs may come from two tapes in two synchronized video tape recorders, each of which has one image of a stereo-pair. The encoded output signal may be recorded as a 3D master video tape or may be directly connected to the transmission means.

The transmission means interconnects the stereo encoder means or the play back means of the 3D master vide tape with the display means. This may be by a video coaxial or optical fiber cable, or by an RF transmitter at the station and RF receiver in the TV set. In the latter case, the RF signal can be sent via an RF cable or by microwave or by satellite and by over-the-air broadcasts on conventional channels including subscription TV (with a scrambled image). Also video cassette or video discs may be used to store and play back the 3D picture.

A conventional color television set or a television projector displays the color-coded stereo-pair of images superimoosed on its screen. The viewers wear color decoding (anaglyph) stereoscopic glasses, which channel the appropriate image to each eye.

Accordingly, a principal object of the present invention is to provide an improved stereoscopic method and system.

Another principal object of the invention is to provide an inexpensive and practical means of providing television viewers with true three dimensional pictures with little or no modifications to existing television equipment and using only a conventional TV channel, both for industrial and entertainment uses.

Another object of the invention is to provide a convenient method of using existing and newly produced 3D motion pictures and slides, and 3D video tapes for television entertainment.

A further object of the invention is to provide an improved form of 3D television camera which can pick-up (for recording or for "live" transmissions) new programming. Another purpose of this invention is to use existing television equipment and broadcast TV channels, thus bringing this new form of entertainment and information to TV viewers at little or no cost.

An additional object of this invention is to provide an improved three dimensional film system, which uses a single camera and a single projector.

An important object of this invention is to convey depth and spacial pictorial information in an improved manner which cannot be communicated with flat two dimensional television.

An object of this invention is to provide not only three dimensional black-and-white pictures and two-color pictures, but also full color pictures.

Other objects will become apparent upon reading the following detailed description taken with the accompanying drawings which set forth by way of illustration and provide examples of certain embodiments of the inventions.

BRIEF DESCRIPTION OF DRAWINGS

FIG. 1 is a schematic diagram of a stereoscopic picture system which picks up a stereo pair of images of the scene and displays such in separate colors for viewing with anaglyph glasses.

FIG. 6 is a schematic block diagram of black-and-white stereoscopic video encoder.

FIG. 10A is a top diagramatic view at A—A of the apparatus of FIG. 10 and a viewer's head.

FIG. 11 illustrates the optical filtering mechanism of anaglyph glasses viewing a black-and-white picture.

FIG. 11A illustrates the optical filtering mechanism of anaglyph glasses viewing a full color picture.

FIG. 12 is a diagram illustrating the functional operation of a black-and-white stereoscopic television system.

FIG. 13 is a diagram illustrating the functional operation of a limited (two) color stereoscopic television system.

FIG. 14 is a diagram illustrating the functional operation of a full (three) color stereoscopic television system.

FIG. 15 is a detailed block diagram of an encoder of FIG. 6.

FIG. 16 is a detailed block diagram of an encoder of FIG. 6A.

DETAILED DESCRIPTION

Stereoscopic System

Figure 2A:
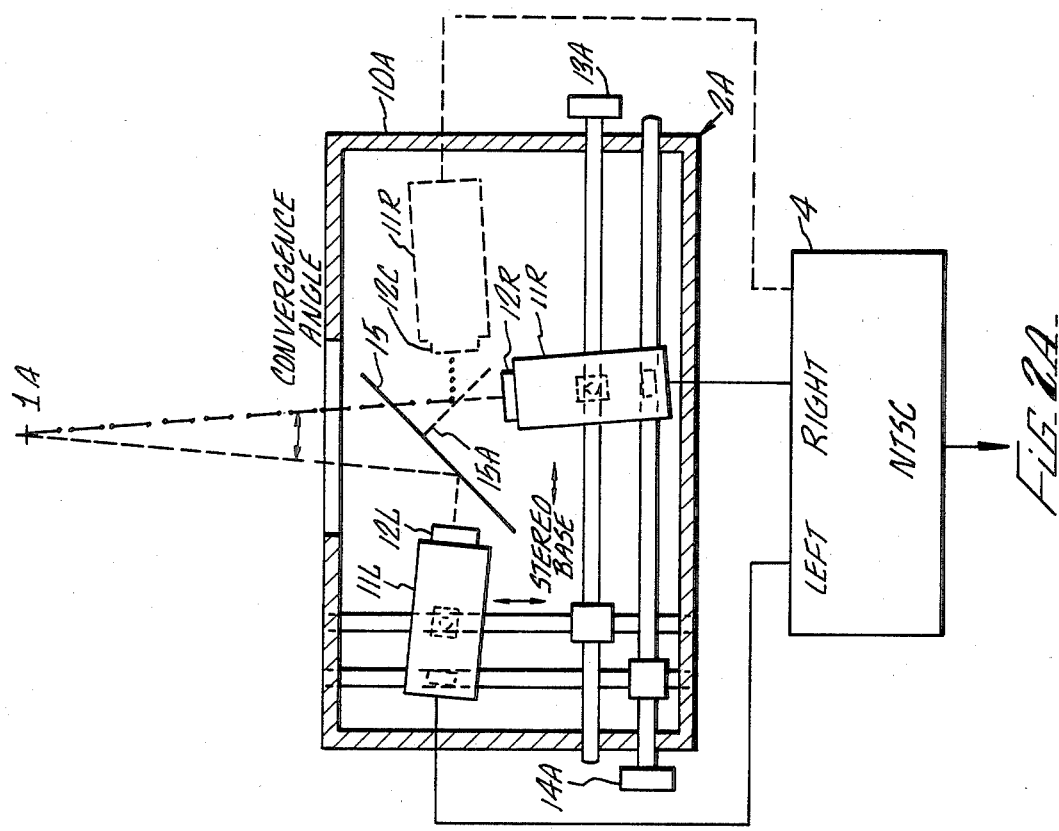
FIG. 2A is a top cutaway view of a stereoscopic camera comprising two black and white television camera heads disposed at right angles to each other using a semi-silvered mirror to aim and focus on the scene.

In the following description, television is used as a means of portraying the invention and exemplary embodiments thereof in a specific form. However, the invention is not limited to television and computer generated video graphic displays, but can be used with film projections and other graphic displays.

FIG. 1 is a schematic diagram of the stereoscopic television system. A stereo-pair of two images of a principal object of interest 1A in scene 1 are picked up by a stereoscopic camera 2 which may be a television camera. If the camera 2 is a film camera, then an optional stereoscopic film chain 2A converts the photographic images to electronic images. These two images are recorded by a dual video recorder 3. A stereoscopic video encoder 4 electronically color codes each image of the stereopair and superimposes the two images. The output signal is usually NTSC (or PAL or SECAM) coded. An optional anaglyph stereoscopic video recorder 5 may record and later play back the stereoscopic color coded video signal. A stereoscopic video transmission means 6 sends the stereoscopic TV signal from stereoscopic encoder 4, or the optional stereoscopic recorder 5, to a stereoscopic anaglyph display 7 which displays stereoscopic colored anaglyph picture 8. Stereoscopic anaglyph glasses 9 are utilized by each viewer to see on display 7 a reproduction of scene 1 in three dimensions.

Stereoscopic Camera

Figure 2:
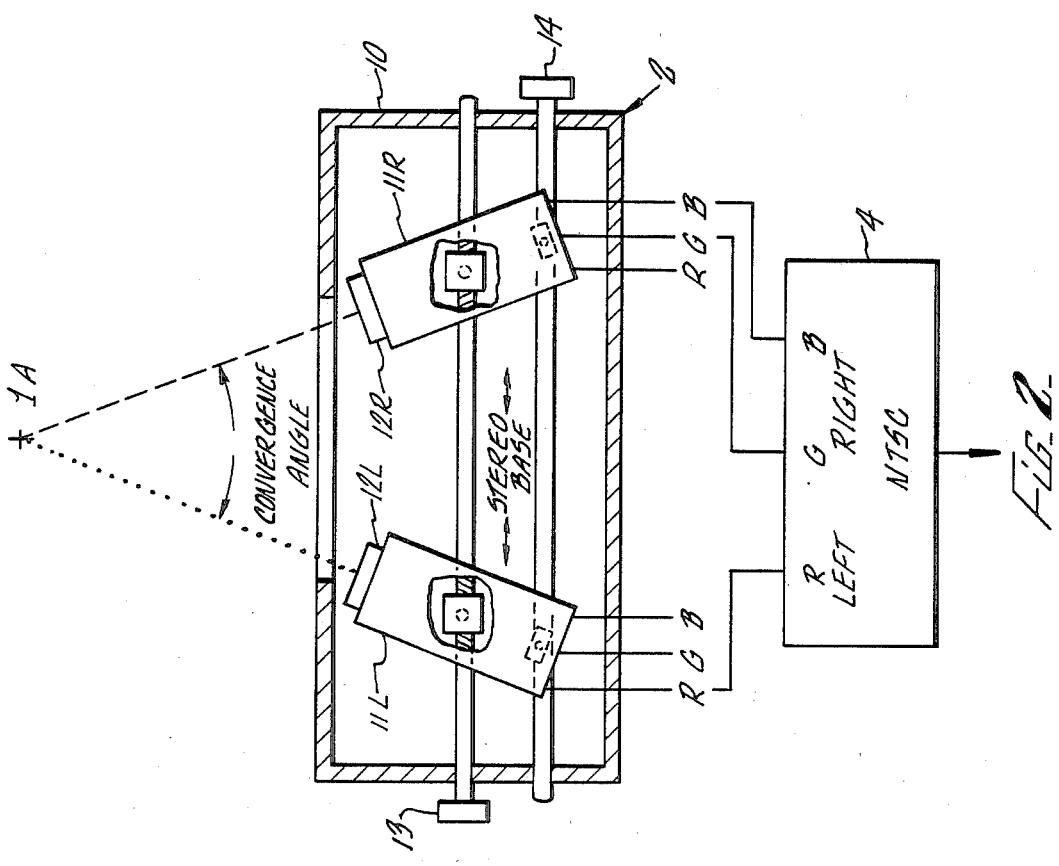
FIG. 2 is a top cutaway view of a stereoscopic camera comprising two color television camera heads aimed and focused directly on the scene.

FIG. 2 is a top cutaway view of the stereoscopic camera 2. A camera housing 10 contains a left television camera head 11L with a lens 12L, and a right television camera head 11R with a lens 12R. A control 13 mechanically operates a suitable mechanism to move the camera heads 11L and 11R together and apart thereby changing the "stereo base" to adjust for varying distances between the camera 2 and the object of principal interest 1A in the scene 1. A stereo base of about 2½″ compares with the interocular distance between an adult's eyes. Smaller stereo bases are desirable for closeup subjects and larger bases for more distant subjects. The focal length of camera lenses 12L and 12R has no effect on the stereo base.

A control 14 operates a suitable mechanism to pivot the camera heads 11L and 11R on their vertical axes so that the lenses 12L and 12R are aimed at and converged on the object of principal interest 1A. As the object 1A moves toward the camera 2, the convergence angle must be increased. As the object 1A moves away from camera 2, the convergence angle is decreased so that if the object 1A is at infinity, camera heads 11L and 11R are parallel.

The controls 13 and 14 can be mechanically operated at the camera 2 or electronically operated by a motor at a remote distance. Controls 13 and 14 can be temporarily interlocked because the angle of convergence generally decreases for distant objects which also requires a greater stereo base. Conversely, the angle of convergence generally increases for close objects which require a smaller stereo base.

If the lenses 12L and 12R are fixed focus lenses, they should be closely matched in focal length. If zoom lenses are employed, they should be well matched and should operate in unison to change focal lengths. The zoom controls can be mechanical or electronic. Left and right camera heads 11L and 11R may be color cameras with red (R), green (G) and blue (B) outputs from each. However, if the output of each camera head is an NTSC coded signal, then as NTSC-RGB decoder may be used to obtain RGB outputs. RGB outputs of the color camera heads 11L and 11R or their camera control units (not shown) are available with some cameras. Camera heads 11L and 11R must be electronically tied together with a common sync generator (not shown).

The R output of the left camera head 11L and the G and B outputs of the right camera head 11R can be directly connected to a stereoscopic video encoder 4 for "live" pick-up (without recorder 3) which superimposes the two images and encodes them in NTSC at the output. This system does not have the disadvantage of using color filters in front of the lenses 12L and 12R or other optics which reduce the amount of illuminations that reach the pick-up tubes of the cameras. Also, convergence and stereo base adjustments can be more easily made.

There are a number of other two camera head optical configurations known in the art used for stereoscopic picture pick-up.

FIG. 2A is a top cutaway view illustrating another configuration for the camera 2. A housing 10A contains a left television camera head 11L with a lens 12L, and a right television camera head 11R with a lens 12R mounted at right angles to each other. A control 13A mechanically operates the stereo base mechanism and a control 14A mechanically operates the convergence mechanism. The camera head 11L is disposed at 90° to the pick-up axis of the camera. A left image of the object 1A is reflected by a half-silvered mirror 15 and appropriately focused by the lens 12L in the camera head 11L. A right image of the object 1A is transmitted by the mirror 15 and focused by the lens 12R in the camera head 11R. The horizontal electronic sweep of the camera head 11L is reversed to compensate for the image reversal caused by the mirror 15. There is more than a 50% loss of light reaching the camera heads 11L and 11R in this configuration.

The advantage of this configuration is the ability to have a very small stereo base even with relatively wide or bulky cameras, while retaining a variable stereo base such as provided by the configuration of FIG. 2. The minimum stereo base of the FIG. 2 set-up is limited by the width of the camera head which often results in a stereo base considerably greater than $2\frac{1}{2}''$.

If the left and right camera heads 11L and 11R are black-and-white cameras, then left and right signals are sent to the stereoscopic video encoder 4 which electronically colors each image, superimposes them and NTSC codes them.

Alternately, a black-and-white camera head 11L could have a red filter in front of the lens 12L and a black-and-white camera head 11R could have a cyan (blue-green) filter in front of the lens 12R. The two signals from the cameras then provide color information as well as stereoscopic data, and the encoder 4 is not be required to electronically color the signals. The displayed picture is in 3D and color. However, the color would be limited to that of a two-color system (red and cyan) which is not as satisfactory as a three color system (red, green and blue).

A three color system can be achieved by using optional half silvered mirror 15A in the right light path of the camera 2A and adding another camera 11C and a blue filter in front of lens 12C to receive the blue characteristics of object 1A. The camera head 11R will have a green filter to receive the green characteristics of object 1A. Thus, the three separate color signals of camera 2A will be similar to those of camera 2 in FIG. 2.

Another method of achieving three separate color signals in FIG. 2A is to use a color camera head for camera 11R with the red signal disconnected (like in FIG. 2) and to use a black-and-white camera head for camera 11L with a red filter at lens 12L. This arrangement then provides a red signal from camera 11L and green and blue signals from camera 11R. Encoder 4 of FIG. 2 is required with three (R, G, B) inputs.

Figure 3:
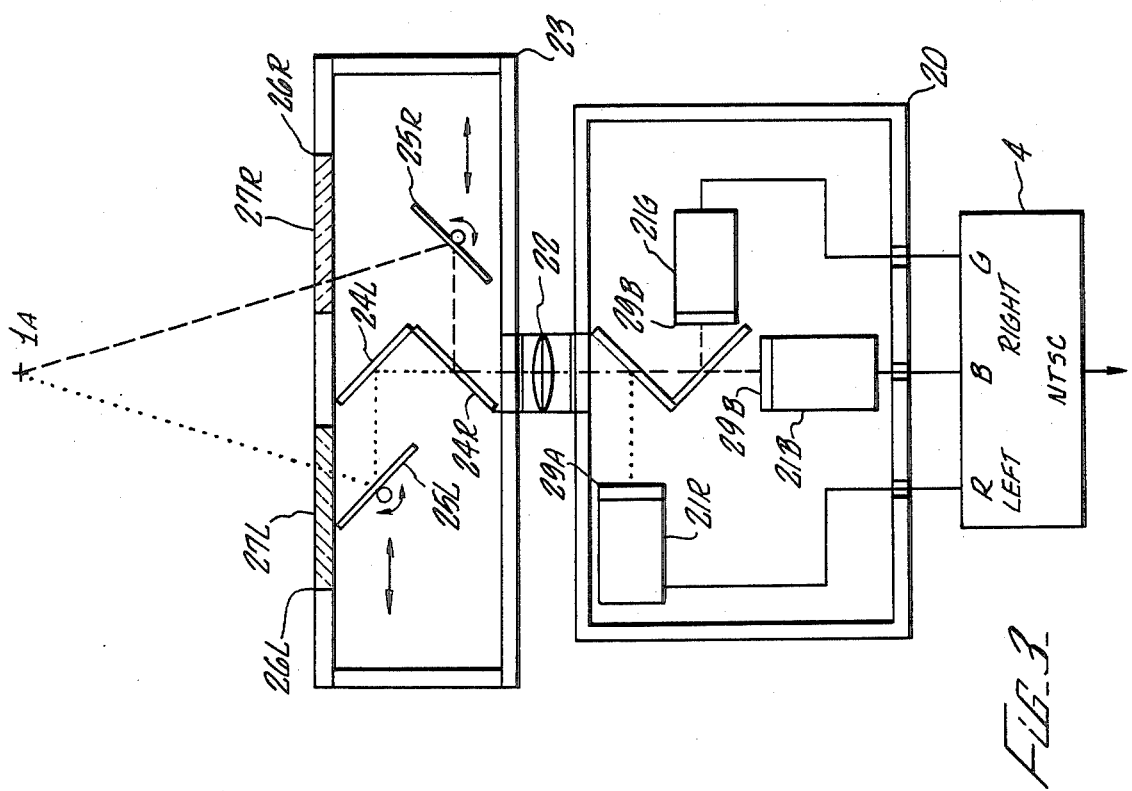
FIG. 3 is a top cutaway view of a stereoscopic camera comprising beam splitting means associated with the lens of a single color TV camera.

An anaglyph beam splitter may be used on a single color video camera. FIG. 3 is a top cutaway view illustrating a three-tube color camera 20 with a green pick-up tube 21G, a red pick-up tube 21R and a blue pick-up tube 21B, and a stereo-optical device 23 attached to a lens 22 of the camera 20. The stereo-optical device 23 comprises inner mirrors 24L and 24R and outer mirrors 25L and 25R. Light from the object 1A passes through apertures 26L and 26R with filters therein as described below. Outer mirrors 25L and 25R reflect light from the object 1A at approximately 90° to the inner mirrors 24L and 24R, respectively. The mirror 24R is half-silvered to allow light from the aperture 26L and reflected by mirrors 25L and 24L to pass through it, and to reflect light from aperture 26R which is reflected by mirror 25R. At the aperture 26L there is first filter 27L (for example, a red filter), and at the aperture 26R there is second filter 27R (for example, a cyan filter). Red characteristics of image 1A are picked-up through the red filter 27L in the aperture 26L, relayed by the mirrors 25L and 24L and transmitted through lens 22 to the mirror (or prism) system of the color TV camera 20 so that only the red pick-up tube 21R receives this left image.

The blue and green characteristics of image 1A are picked-up through the cyan filter 27R in the aperture 26R, relayed by mirrors 25R and 24R and transmitted through lens 22 into the mirror system of the color TV camera 20, so that only the blue and green pick-up tubes 21B and 21G, respectively, receive this right image.

Alternately, a polarizing filter 27L with a ninety-degree axis can be used in aperture 26L and a corresponding polarizing filter 29A used in front of red tube 21R; and a polarizing filter 27R with a zero degree axis may be used in aperture 26R, and corresponding polarizing filters 29B used in front of blue tube 21B and green tube 21G. The outputs of the tubes 21R, 21G and 21B are sent to the encoder 4 wherein the images are superimposed. The output of the encoder 4 is a NTSC encoded signal that carries the left (red) image and the right (blue and green) image which will be seen by respective eyes of the viewer.

Figure 4:
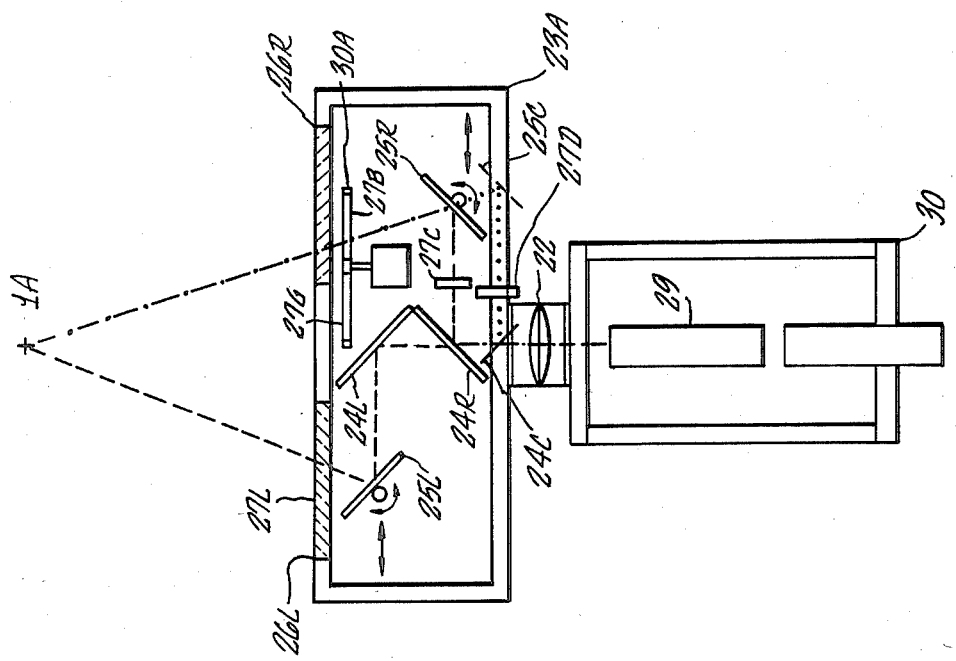
FIG. 4 is a top cutaway view of a stereoscopic camera comprising beam splitting means associated with the lens of a film camera.

FIG. 4 is a top cutaway view which shows a similar anaglyph stereoscopic beam splitter 23A on a still or motion picture film camera 30. In this case, red light transmitted through a red filter 27L in the left aperture 26L of the beam splitter 23A exposes the red layer of film 29. A motorized and synchronized color wheel 30A (locked with the film frame rate) has a blue filter 27B and a green filter 27G located in the path of the light through the right aperture 26R of the beam splitter 23A. The wheel 30 is synchronized to rotate first the blue filter 27B and then the green filter 27G into the light path for each respective frame exposed of film 29.

In this manner, each frame of color film 29 is continually exposed by the red light characteristics of object 1A and sequentially exposed by blue light and green light characteristics of object 1A.

Alternately, stereoscopic beam splitter 23A can be configured so that the green and blue light continuously expose film 29 by modifying the right side of stereoscopic beam splitter 23A. In this case, the mirror 25R is half-silvered, another full mirror 25C is placed behind it, and another half-silvered mirror 24C is placed in front of lens 22. The color wheel 30A is eliminated, a blue filter 27C is placed in the light path between the mirrors 25R and 24R, and a green filter 27D is placed between the mirrors 25C and 24C.

Stereoscopic Film Chain And Video Recorder

Figure 5:
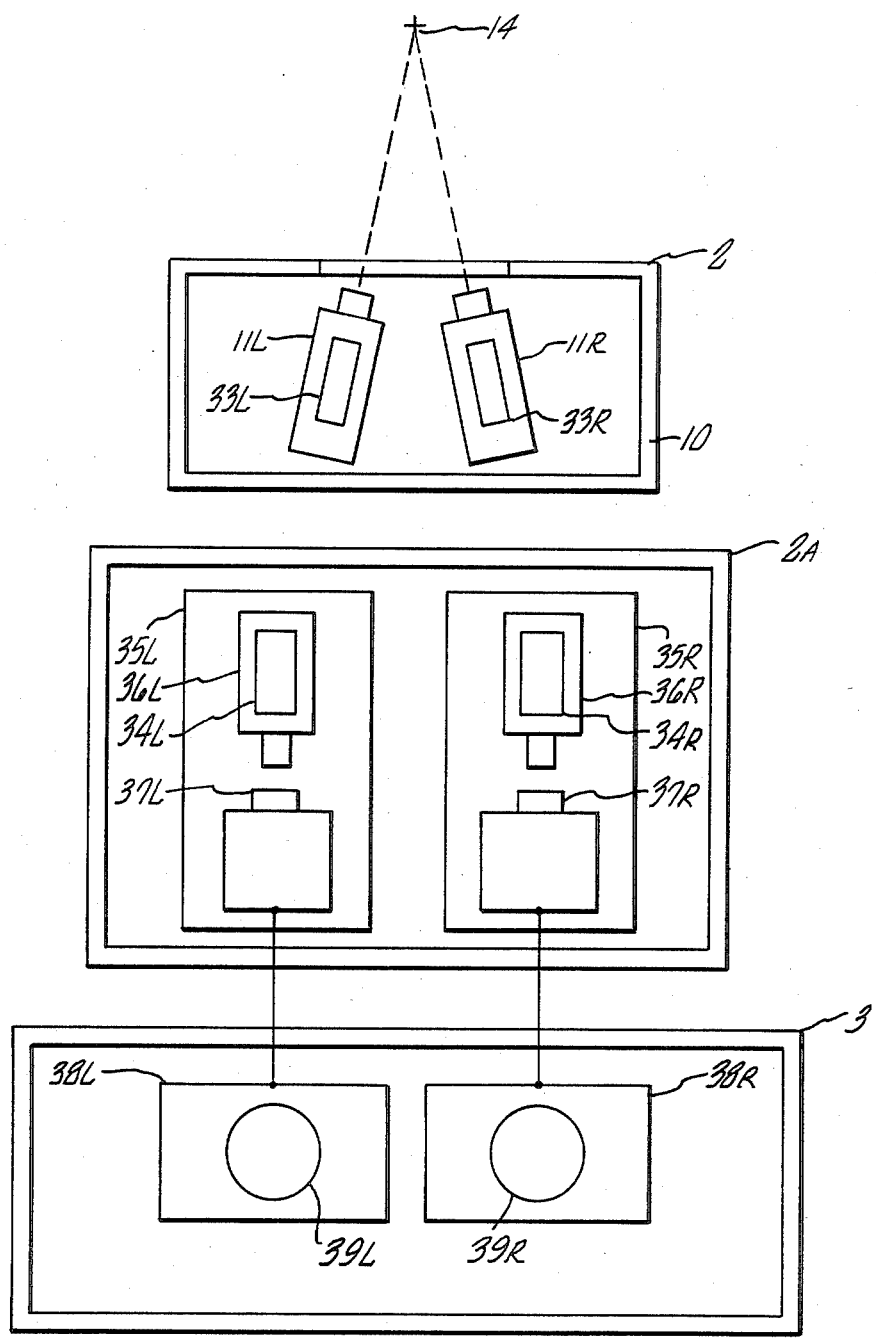
FIG. 5 is a top cutaway view of a stereoscopic film camera, and a stereoscopic film chain with associated film projectors and TV cameras and dual video recorders.

FIG. 5 is a top cutaway view of a stereoscopic camera, an optional stereoscopic film chain 2A and a dual video recorder 3. The stereoscopic camera 2 is shown including film camera heads 11L and 11R in a housing 10. Stereo base, convergence and lens controls are not shown but can be similar to those shown in FIG. 2. Film magazines 33L and 33R are exposed with a stereo-pair of images of the object 1A. The two processed films 34L and 34R are placed in the stereoscopic film chain 2A comprising film chains 35L and 35R (of flying spot scanners) operating in a synchronous and locked together mode. A film projector 36L is loaded with film magazine 34L and a film projector 36R is loaded with film magazine 34R. The films are projected into TV cameras 37L and 37R. The left and right signals can be transmitted "live" or recorded by the dual video recorder 3 which includes two synchronized videotape recorders (VTR's) 38L and 38R with video tapes 39L and 39R. Alternatively, a single film chain rather than two can be used to first record video tape 39L and then to record video tape 39R.

Alternately, stereoscopic camera 2 may have a single camera head which picks up the stereo-pair of images and multiplexes them spacially or temporally through optical and/or electronic multiplexing means. The left and right eye images may be picked up alternately or may be positioned in a single image frame over-and-under or side-by-side. The disadvantages of a single camera system are loss of resolution (either horizontal or vertical) and complexity of equipment or circuitry.

The stereo-pair of images from a single TV camera is recorded on a single video tape or broadcast video disc by recording means 3 and electronic means are used to segregate the left and right images, such as in a stereoscopic field sequential system. The stereo-pair of images from a single film camera is recorded on a single film strip. The single 3D film can be run twice through a film chain—once for the left image and again for the right image. Two separate reels of video tape 39L and 39R are made.

If the picture is optically anamorphized, it may be electronically deanamorphazed. If the film picture format is too wide for the TV screen, "Letter boxing" or "Pan scan" techniques can be used.

When a previously-made 3D film is played back for recording on video tape or for "live transmission," it is possible to adjust the position of each image electronically or optically. This is done vertically and horizontally to correct for any misalignment which may have occurred in the original filming. Also the convergence can be adjusted if errors were made in the original filming or if a different adjustment of convergences will provide a more pleasing result on the television screen. This system also permits differences in density between one image of the stereo pair and the other or from one scene to another to be adjusted electronically so that the densities are matched. Color differences which may have occurred between one image and another or between one scene and another can also be adjusted. Lastly, if the two images of the film are out of synchronism, this can be adjusted electronically. This occurs sometimes in the original editing of the film or is due to errors in splicing the print(s) during a theatrical run of the film.

Stereoscopic Video Encoder

FIG. 6 is a schematic diagram of a black-and-white stereoscopic video encoder 4 for black-and-white images. A left image signal and a right image signal are applied to the encoder 4. These signals can come from camera 2, the film chain 2A or the dual video (tape or broadcast disc) recorder 3.

If they come from camera 2, they come from black-and-white TV camera heads therein. If they come from the film camera 2, they are derived from black-and-white films recorded by the camera 2 and consequently come from the film chain 2A or black-and-white video tape or broadcast video disc in the recorder 3. Alternatively, if color film or a color TV camera is utilized, the original color thereof may be electronically removed by color trap circuits 40L and 40R in the stereoscopic encoder 4 so that each image is black-and-white. The encoder 4 has gain controls 41L and 41R to increase each signal to full strength.

The encoder 4 electronically colors each image differently in color coding circuits 42L and 42R by color vector shift to obtain the desired hue. The images are superimposed into a single signal in a circuit 43 by the type of electronic circuits sometimes used in TV special effects generators. Each color has a signal level adjustment 44R, 44B and 45G. Circuit 45 codes the RGB signals to NTSC.

Figure 6A:
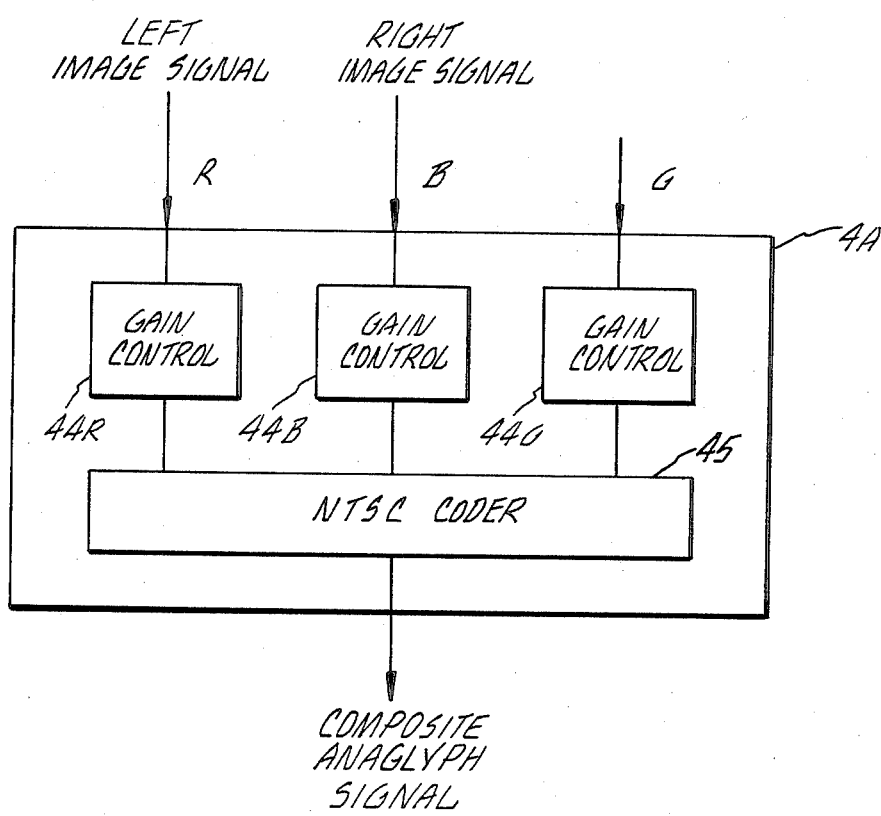
FIG. 6A is a schematic block diagram of color stereoscopic video encoder.

FIG. 6A is a schematic diagram of a simplified full color encoder 4A. If the outputs of the camera 2, film chain 2A, or recorder 3 are NTSC color signals, they can be decoded to RGB signals. The left image then is the red signal and the right image is the blue and green signals. Gain control circuits 44R, 44B and 44G adjust signal strengths as required. The RGB signals are superimposed in coder 45 which provides a NTSC composite anaglyph signal output.

The stereoscopic anaglyph output from the encoder 4 may be transmitted by video transmitting means 6 of FIG. 1. Also the output may be recorded as a 3D master video tape on the optional conventional video tape recorder 5 for later playback. Copies of the 3D master video tape can be made for transmission over television broadcasting, cable or subscription stations. The copies can also be used for airline inflight or hotel entertainment. Video cassettes or video discs can be mass duplicated from the 3D master video tape. Industrial, educational and medical applications and uses will be apparent.

ANAGLYPH COLOR CODING

Figure 7:
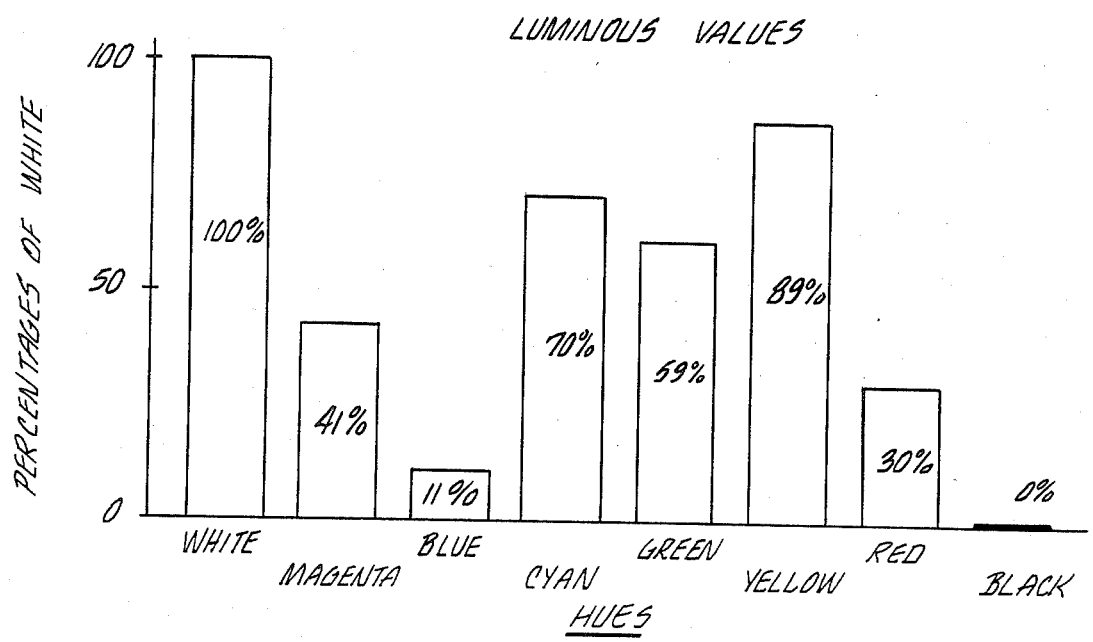
FIG. 7 is a bar graph of NTSC code luminous values of primary and secondary color hues.

The output of the camera 2, or the color coder circuits 42L and 42R of the encoder 4 in FIG. 6, may use one of the pairs of electronically coded color hues shown in Table I below. For example, the outputs of color camera heads 11L and 11R of FIG. 2 are color coded and can be used directly, or if black-and-white camera heads 11L and 11R of FIG. 2A are used, their outputs can be color coded by the black-and-white encoder 4 of FIG. 6. Also given in this Table are the luminous values as a percentage of white. FIG. 7 provides the luminous values of the primary and secondary hues as a bar graph.

TABLE I

| Combination Number | 1st Color Signal Hue(s) | % of White | 2nd Color Signal Hue(s) | % of White |
|---|---|---|---|---|
| TWO PRIMARIES | | | | |
| 1 | Red | 30% | Green | 59% |
| 2 | Blue | 11 | Red | 30 |
| 3 | Blue | 11 | Green | 59 |
| PRIMARY & SECONDARY | | | | |
| 4 | Red | 30 | Blue-Green (Cyan) | 70 |
| 5 | Green | 59 | Red-Blue (Magenta) | 41 |
| 6 | Blue | 11 | Red-Green (Yellow) | 89 |

There are several considerations involved in choosing the optimum combination. Generally it is desirable that the combination of color hues chosen have percents of white (luminous values) for the first and second color signals which are or can be adjusted to be similar, and that each of whose values is strong enough to have an acceptable signal-to-noise ratio. For example, combinations 1, 2, 4 and 5 can be adjusted to have signals with nearly equal luminance values without excessive noise when the one color is amplified to approximately equal the value of the other color. Combinations 3 and 6 are not desirable because the first color has a luminous value of only 11% (with respect to white, which is considered to be 100%); whereas, the second colors have values of 59% and 89% respectively. In these two combinations, if the first color signal is amplified to equal the second color signal, the noise in the first color signal will be excessive. Combination 2 is not desirable because both signals are low and both would have to be amplified considerably for each to have 100% luminance, thus causing each to have excessive noise.

Figure 8:
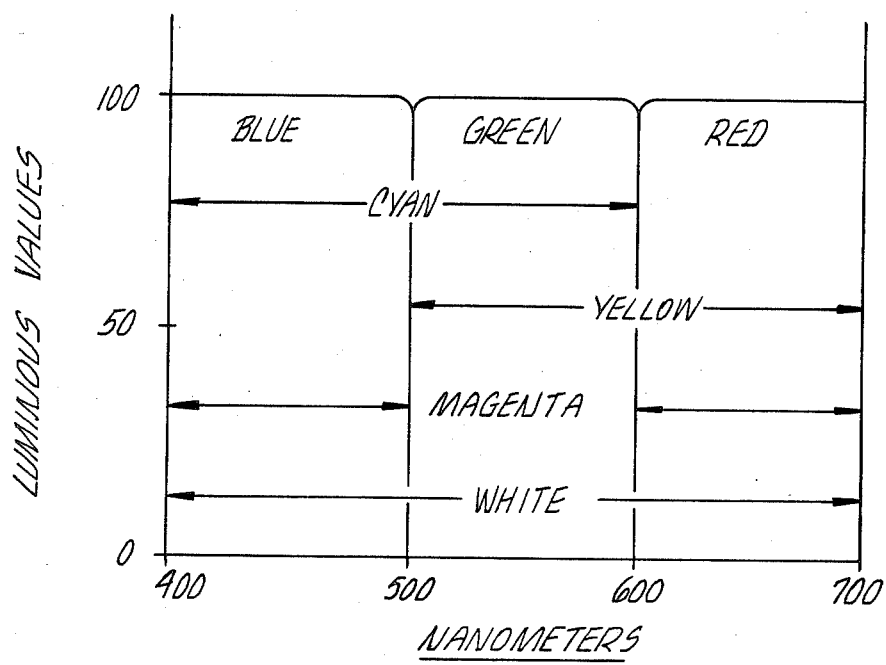
FIG. 8 is a graph of the idealized square wave curves of each color hue.

FIG. 8 is a graph which shows idealized square wave curves of each of the color hues of Table 1. The anaglyph color TV system has several means that can adversely affect the displayed color. The stereoscopic color TV camera 2, the color TV camera 20, color film camera 30, or TV cameras 37L and 37R of the film chain 2A, conventionally have optical filters and electronic circuits which have less than perfect color characteristics. The stereoscopic encoder 4 electronically colors the picture and/or influences the color of the picture. Electronic circuits and phosphors of the CRT in the stereoscopic display 7 have certain color characteristics. Each of these components or characteristics can adversely affect the displayed color and may result in color contamination. That is, one primary color in the scene may be reproduced as a mixed color, composed of the primary color and another color.

Figure 9:
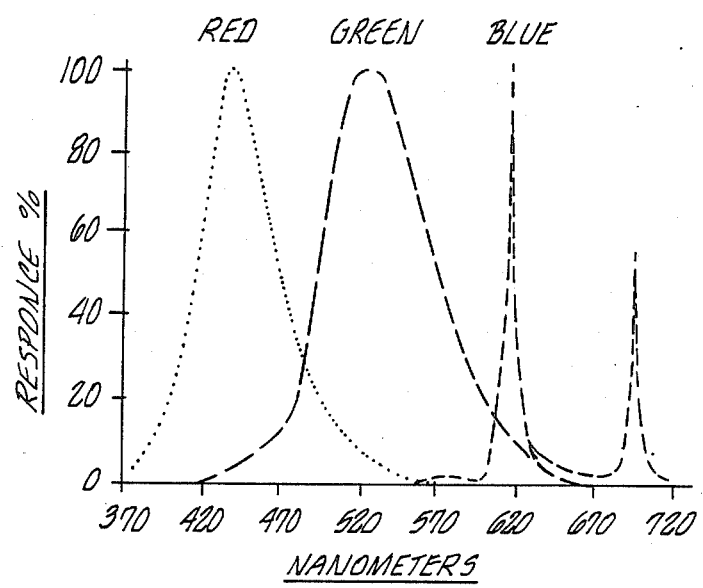
FIG. 9 is a graph of primary colors produced by CRT phosphors.

When the NTSC, PAL, or SECAM coded color TV signal is received by a television receiver, its electronic decoder provides RGB (red, green, and blue) signal outputs. These outputs are connected, one primary color to each gun of the CRT (cathode-ray tube). The screen of the CRT has a dot or a line pattern of each of the three primary phosphor colors (red, green and blue). FIG. 9 shows a graph of typical wave-length curves of luminous excitation of the three CRT phosphors. These three curves have slopes dissimilar to the ideal curves of FIG. 8 and they overlap in some areas further resulting in some color contamination.

The color TV camera 2 can cause contamination. For example, the red illumination from the scene should only be picked up by the red tube of the color TV camera 20 (FIG. 3), causing only a red signal to be transmitted for the red elements of the scene. However, camera electronic and optical inaccuracies and tolerances are such that the green tube may pick up some red light, causing contamination. This may result in the encoder 4A of FIG. 6A providing a dominate red signal and a slight green signal causing the red gun of the CRT to excite the red phosphor and the green gun to excite and illuminate slightly the green phosphor.

In order to reduce the contamination caused by TV camera inaccuracies and overlap of CRT phosphor colors, it is desirable that the encoder 4 be set to produce a deep red with a long wavelength of light which will have less green contamination than that of a light red. In the case of blue, the encoder 4 should produce a deep blue with a short wavelength of light to reduce green contamination. When green is produced, it likewise should be a deep green with a midway wavelength to reduce red and blue contamination. In the case of cyan, the blue should be emphasized more than the green so that there is no red contamination. If yellow is desired, it should be an orange hue, closer to red, thereby reducing green contamination. Magenta should be composed of deep red and of deep blue colors to reduce green contamination.

Referring again to Table I, combination 2 is the most desirable from a contamination point-of-view because red and blue wavelengths are separated by green. Combinations 4 and 6 are the next most desirable from a contamination point of view. In combination 4, cyan can be selected to be bluish to reduce possible contamination between green and red. In combination 6, yellow can be selected to be reddish (orange). If combinations 1 or 3 are chosen, the green should be shifted toward blue in the former, and toward red in the latter. Combination 5 has the disadvantage of magenta having two adjoining borders between colors. Therefore, in this combination, within the bandwidth for each color, green should be a middle wavelength, red should be a high wavelength and blue a low wavelength.

Another critique for choosing the desired combination of colors from Table I, is to select the combination which produces white when the two colors are mixed and superimposed. If, for example, black-and-white film or a black and white video camera is used, the display picture 8 should look black and white in the areas of the scene which are superimposed because the optics of the camera are converged on the object of primary interest. This object will appear to lie at the "stereo window" which is the surface of the CRT. Anything in front of the window or behind it will have color fringes on each side. The further the object is from the stereo windows, the wider the fringes. The fringes on one side are one color, and on the other side are a second color. Also, the fringes will reverse position depending upon whether the object is in front of or behind the stereo window. A displayed picture, which appears primarily black and white, is desirable because it is almost compatible. That is, it looks almost normal on a black-and-white TV set or on a color set. However, the fringes are more evident on a color set because they are the only colored areas of an otherwise black and white picture. Combinations 4 and 5 produce the optimum black and white picture. Combination 6 is poor and combinations 1, 2 and 3 cannot produce a true white.

If a color film camera or a color video camera is used, the combination of color hues chosen from Table I should produce an optimum full color picture in the superimposed areas. The quality of color imagery should be that of a good three color system. Combinations 4, 5 and 6 are the best for this purpose. Combination 5 is generally considered to produce the best color picture. Combination 4 is next, and combination 6 is the least desirable. Combinations 1 and 2 are good and combination 3 is not desired for color images.

Previous reported anaglyphic stereoscopic systems used three-color cameras with color film in a film camera or a color TV camera. However, two colors (such as green and blue of combination 4) were tied together (as cyan) degrading the system to a two color system. That is, green objects or blue objects of scene 1 are both reproduced as cyan. The two color system can not reproduce green or blue separately. The present invention maintains each of the three colors separate as will be further described below. The display with or without glasses appears as a full (three) color picture permitting the viewer to see red, green and blue independently and mixtures of all hues.

In summation, the combination chosen from Table I should be selected for the following attributes:
1. The illumination of the first and second color signals should be strong enough so that when amplified, the noise is not unnecessarily excessive, and the illumination of the first and second colors should not be too dissimilar in luminosity (e.g., not one at 11% and one at 89%) strength;
2. The first and second color signals should have only one common border and not two;
3. The actual hue of the color signals chosen should be selected so as to fall as far as possible away from the borders between the primary colors;
4. The first and second color signals, when overlapped, should be capable of producing a true white; and
5. The first and second color signals, when overlapped, should be capable of producing a good color picture.

Another consideration is compatibility. If 3D black-and-white video picture 8 is semi-compatible, it will appear in monochrome 2D with only minimum visible fringing on a black-and-white TV set and will appear, without using the glasses 9, in 2D black-and-white on a color TV set 7 with slight color fringing. With the stereoscopic glasses 9, the picture 8 will be in 3D and in black and white on the color set 7 with no fringing.

If the 3D color video picture 8 is semi-compatible, it will appear in monochrome 2D on a black-and-white set with only minimal visible fringing and will appear, without using the glasses 9, in 2D color on the color set 7 with little evident color fringing. With the glasses 9, the picture will be in 3D and in color on the color TV set 7 with no fringing.

Another approach to compatibility is to use one colored image (usually green) as the dominant signal and transmit this via the luminance channel. The luminance channel is the only signal that will appear on a black and white set or on a color TV set when the color is turned down. The other color is transmitted in the color portion of the color signal and it plus green appear in 3D on a color TV set.

Stereoscopic Display

Figure 10:
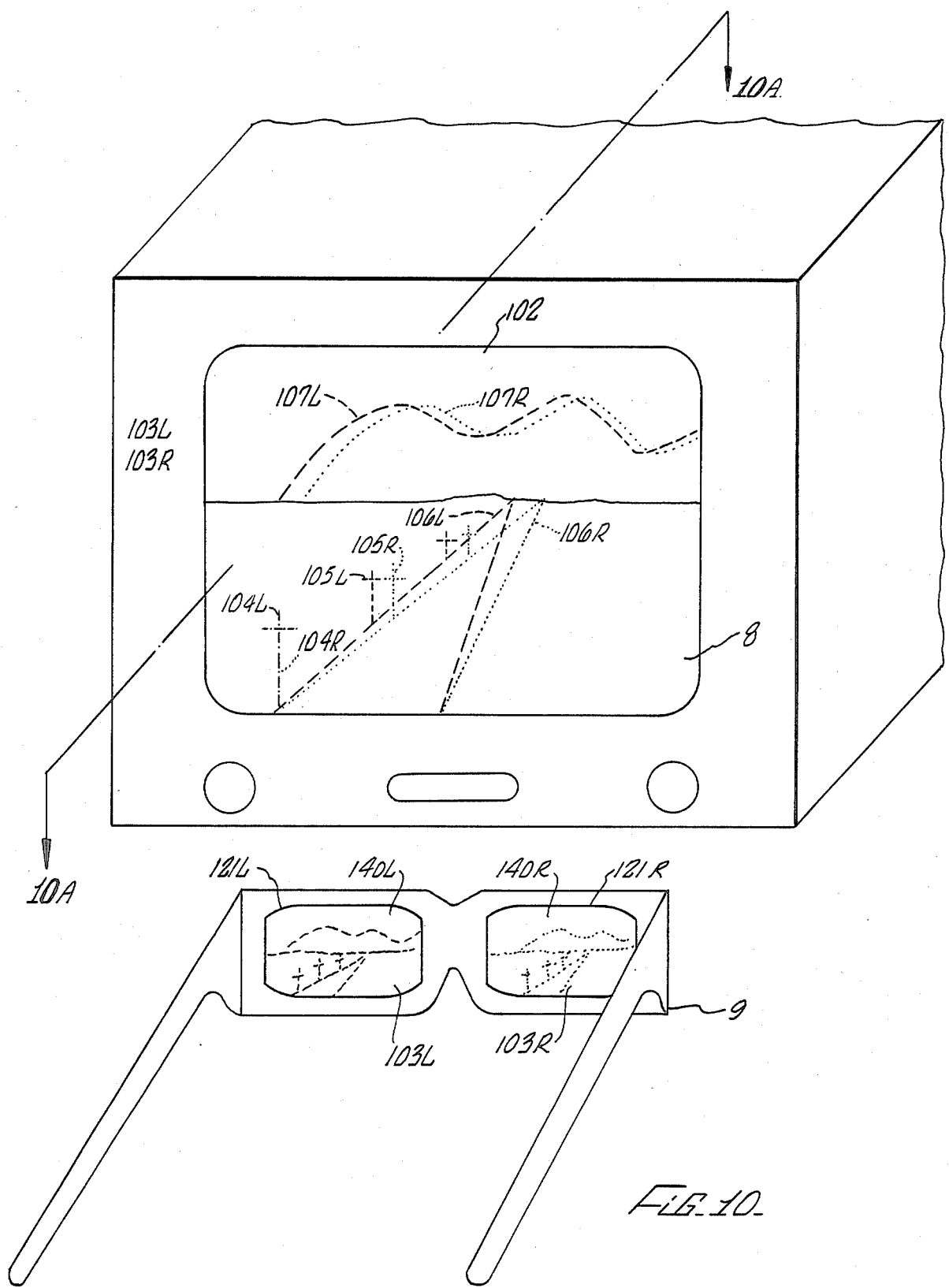
FIG. 10 is a perspective view of stereoscopic glasses and a color TV set as a stereoscopic anaglyph display.

FIG. 10 is a perspective view of a stereoscopic anaglyphic picture 8 composed of a stereo-pair of red and green images which appear black-and-white on the color television receiver 7, and the two-color anaglyph viewing glasses 9.

The television receiver 7 has on its color cathode-ray tube (CRT) 102 anaglyph picture 8 reproducing a three dimensional scene. This scene has white telegraph poles 104 and 105 on a dark gray road 106 leading to medium gray mountains 107. The sky and land backgrounds are light gray. Picture 8 comprises a stereo-pair of superimposed images, each in a different color. Left image 103L is electronically colored red and right image 103R is electronically colored cyan. Each one of the colored images portrays objects with the same varying levels of its one color from full (100%) luminosity to no (0%) luminosity; therefore, the three dimensional picture will be perceived as being black and white because the additive mixture of red and cyan creates white.

Images 103L and 103R are seen without the glasses 9 as superimposed on the CRT 102 in various intensities of white, gray and black with color fringing. The first telegraph pole 104 appears white since it is composed of a red telegraph pole 104L and a cyan telegraph pole 104R which are completely superimposed on top of each other creating a white pole at the "stereo window", which is the front of the screen of the CRT 102. The second telegraph pole 105 compries a red telegraph pole 105L offset from a cyan telegraph pole 105R. A dark red road 106L and dark cyan road 106R are in registration at the screen of CRT 102 and appear gray, but as the road 106 extends back toward distant mountains 107 it becomes separated into 106L and 106R. Mountains 107 are clearly separated as 107L and 107R.

Anaglyph stereoscopic filter glasses 9 have two apertures 121L wfth a red filter 140L and 121R with a cyan filter 140R. An image 103L is seen through aperture 121L and an image 103R is perceived through aperture 121R.

FIG. 10A is a top diagramic view at A—A of FIG. 10 showing the CRT 102 and depicting what images a viewer 108 will perceive. The red telegraph pole 104L and cyan -29-telegraph pole 104R of the picture 8 are each assumed to have 50% brightness. These are superimposed and appear white. This area of the picture 8 is brightest and is indicated in FIG. 10A by an arbitrary 100% illumination level. Areas of images 103L and 103R where black objects are superimposed produce no apparent illumination (0%). Areas of images 103L and 103R were medium gray objects (mountains 107) are superimposed produce an apparent illumination of 50%. In FIG. 10A the head of the viewer 108 is shown. The glasses 9 with apertures 121L and 121R are worn by the viewer 108. A red filter 140L is disposed in the aperture 121L and a cyan fflter 140R is disposed in the aperture 121R.

The viewer's left eye 109L perceives only the image 103L and the right eye 109R perceives only the image 103R because of the color filters. The viewer's brain fuses images 103L and 103R together into a single three dimensional picture 112. In the picture 112 the white telegraph pole 104 is seen at the "stereo window". The white telegraph pole 105 is seen within the CRT 102. The dark gray road 106 is perceived extending deep into the CRT 102 and with the medium gray mountains 107 at some distance beyond the "stereo window". The background of the sky and land appears light gray.

Anaglyph Viewing

FIG. 11 is a schematic which illustrates the optical mechanism of conventional two-color anaglyph glasses 9. Black-and-white anaglyph picture 8 on CRT 102 is shown with two points of illumination, namely the red telegraph pole 105L and the cyan pole 105R. The red pole 105L is transmitted through the red filter 140L of the glasses 9, and the cyan pole 105R is transmitted through the cyan filter 140R. The red pole 105L is absorbed and not perceived through the cyan filter 140R. Cyan pole 105R is absorbed and not perceived through red filter 140L. Each eye 109L and 109R of the viewer 108 sees only its intended image through respective filters 140L and 140R. It is assumed that the filters 140L and 140R are nearly perfectly matched to the color phosphors of the CRT 102 and that these phosphors are electronically illuminated to produce anaglyph picture 8. The further assumption is made that the filters are 100% perfect.

Then, the telegraph pole 104 appears 100% white with or without the glasses 9 because it is a superimposition of the red pole 104L and the cyan pole 104R. The red pole 105L and the cyan pole 105R appear to each to be 50% illuminated without using the glasses 9 and 100% white with the glasses 9. The dark gray road 106 (against the light background) generally appears 12.5% white without and 25% with the glasses 9. The medium gray mountains 107L and 107R appear 25% red and 25% cyan respectively without glasses 9. When fused through glasses 9, mountains 107 appear 50% gray. This assumes, for explanation purposes, that the illumination of the two images is 100% additive mentally.

In actual practice, if the filters 140L and 140R are plastic, it is difficult to obtain an exact match between the filters 140L and 140R and the red, green and blue phosphors of the CRT 102. If dichroic interference filters are utilized, the characteristics of the phosphors are more nearly matched. However, the interference type of filters have certain disadvantages. They are usually laid on a glass plate which results in much heavier glasses than those with plastic filters. Furthermore, the filtering action of interference filters is very directional in nature. The filters must be worn perpendicular to the light striking the eye. If they slant sideways or up or down slightly, the color characteristics change. The desirable types of plastic filters are Wratten ones. These are accurately made and are offered in a variety of colors. However, none of the Wratten filter colors match the typical phosphor colors of CRT 102. Interference filters and Wratten filters are expensive and not suitable for mass production. Plastic filters of the gelatin or enameled type are lower priced and can be made to specifications which reasonably match the phosphors of the CRT 102.

Another desirable characteristic of the filters 140L and 140R is they should have a narrow bandpass. For example, the red filter 140L should transmit all of the red light and should not transmit any of the cyan light. This is difficult to obtain in practice and generally some of the light of the other color leaks through. For this reason, it is desirable to select the colors for filters 140L and 140R to be as far apart as possible in the spectrum, and therefore red and cyan are good choices.

Another consideration is to utilize two phosphor colors and two filter colors that are nearly equal in illumination intensity. For example, in television practice, the relative intensity of luminosity for the three primary colors is—green 59%, red 30% and blue 11%. In this case, cyan is 70% (59% plus 11%) which far overbalances 30% for red. Therefore, the pick-up and display of a red-cyan black and white anaglyph picture should be electronically adjusted so that cyan is reduced in intensity to that of red or 30%. This means the relative summation intensity of white on the CRT 102 in such a two color anaglyph system is 60% rather than 100%. Therefore, the picture is not as bright and does not have as many gray levels as a conventional three color picture. If the brightness of the two phosphors are balanced, the objects of interest in registration appear white, black or gray to the viewer without glasses and not tinted reddish or cyanish.

In normal practice, a red filter (Wratten No. or a gel or enameled type filter) transmits about 14% of the light and a cyan filter (Wratten No. 44A or a gel or enameled type filter) transmits about 15% of the light. The anaglyph three dimensional picture 8 when viewed with the filter glasses 9 is seen in considerable reduced intensity compared to the perceived illumination of the picture 8 without glasses. Filters 140L and 140R of the glasses 9 should be balanced from one eye to the other so as to reduce the possibility of retinal rivalry. A white area of 6500° Kelvin color temperature on the CRT 102 should be transmitted with equal intensity through the filters 140L and 140R so that the area appears the same white color temperature to the viewer. If one filter is less dense than the other filter, there is a dominance of that eye and the picture 8 appears either reddish or cyanish. In this case, the viewer may experience color bombardment as the other eye attempts to adjust to match the preferred eye.

Theoritical Discussion of Anaglyph Full Color System

FIG. 11A is a schematic diagram which illustrates the optical mechanism of the anaglyph glasses 9 in viewing the full (three) color anaglyph picture 8. Five points of illuminations are shown, namely, X (black), R (red), G (green), B (blue), and W (white). The red point R with 30% luminosity is transmitted through the red filter 140L in the glasses 9. The green point G with 59% luminosity and the blue point B with 11% luminosity are blocked by the red filter 140L. Only the red component (30%) of the white point W of 100% luminosity is transmitted through red filter 140L.

The red point R is blocked by the cyan filter 140R. The green G and blue B points are separately transmitted by the cyan filter 140R. Only the green and blue components of the white point are transmitted by the cyan filter 140R. The assumption is made that the filters 140 are 100% perfect and the illumination of the two images is 100% additive mentally. The viewer perceives a color anaglyph picture 8 as a full color, well-balanced stereoscopic picture. In actual practice, the brain has some difficulty in fusing and combining stereopairs of images in which a primary color appears in a large area of one image and a corresponding black area appears in the other image. This is a particular difficulty with the primary color red. Therefore, it is usually desirable with respect to large red areas to have the cyan filter leak (pass) some red light. This results in some ghosting of the red image in the right (cyan) eye. In order to achieve optimum results, the cyan filter must be designed to keep ghosting to a minimum and yet transmit enough red light to give a full color stereoscopic picture with the colors only slightly muted. Proper design of the wavelength transmission curves of each filter can achieve the desired result.

FIG. 12, 13 and 14 diagramatically illustrate various types of red-cyan anaglyph stereoscopic systems. FIG. 14 is a particularly new and novel method of picking-up, transmitting and displaying full color, three dimensional scenes. The pick-up and display of depth information has been described above. The systems of these FIGS. 12-14 and their descritpions are limited to the color capability of such systems. The values of luminosity and other calculations provided here are used for illustration purposes and are not meant to be exact.

FIG. 12 is a schematic diagram of a black and white anaglyph television system. Scene 1 is a test chart 130 containing seven chips with a letter designation of the hue above and a percent designation of the luminosity below for each chip. Chip X is black with 0% luminosity. Chip G is gray with 50% luminosity. Chip W is white with 100% luminosity. Chip R is red with 30% luminesity. Chip B is blue with 11% luminosity. Chip G is green with 59% luminosity. Chip C is cyan with 70% luminosity.

The stereoscopic television camera 2 compries two black and white TV camera heads such as in FIG. 2A to pick-up a stereo-pair of images. Camera head 11L is the left pick-up means and camera head 11R is the right pick-up means. The camera head 11L picks-up electronic image 131L in the same tones of black, white, and gray, as camera head 11R picks-up electronic image 131R.

The two images of television camera 2 are individually electronically connected to the left and right signal inputs of black-and-white stereoscopic video encoder 4 as shown in FIG. 6. Left gain control 41L (not shown), electronically adjusts the signal level of the left electronic image 131L so that chip W is equal to 30% luminosity. A right gain control 41R (not shown) adjusts the level of the right electronic image 131R so that chip W is 70% luminosity. This difference in gains gives cyan and red the values required for a balanced color television system which maintains white at a 6500° K color temperature.

A color coder 42L (of FIG. 6) electronically colors the left image 132L red. Likewise, the color coder 42R electronically color codes the right image 132R cyan. The luminosity values in the left image 132L of the red (R) and white (W) chips of test chart 130 are both 30% and gray (G) is 15% because only the red component of white (which is a mixture of red, green and blue components) is produced. The luminosity values of the chips cyan (C) and white (W) in the right image 132R are both 70% and gray (G) is 35% because only the cyan component of white is produced. Blue (B) and green (G) chips are each electronically colored in tones of cyan, e.g. 11% and 59% respectively. They only differ in luminosity value, not color. Electronic images 132L and 132R are superimposed in superimposer 43 (of FIG. 6).

The resulting picture 8 is visually displayed on the color TV receiver 7. The picture 8 appears black and white because the red image 132L is superimposed on the nearly identical cyan image 132R. If there are differences in images 132L and 132R due to depth in scene 1, color fringing such as previously described will appear in picture 8.

The stereoscopic anaglyph glasses 9 have the red filter 140L in the left aperture 121L and the cyan filter 140R in the right aperture 121R. Both filters 140L and 140R have densities such that the white (W) chip of the picture 8 has a 30% luminosity value when seen through either filter 140L or 140R. The brain of the viewer 108 creates a left eye image 103L as a visual image of the electronic red image 132L and a right eye image 103R as a visual image of the electronic cyan image 132R. These images 103L and 103R then are mentally superimposed into a composite black-and-white picture 112, which is a mental reproduction of the picture 8. The picture 8 thus is a black and white reproduction of the test chart 130. Also, the composite picture 112 is a mental reproduction of the test chart 130.

If the system of FIG. 12 is a black-and-white anaglyph film system, the film camera 2 will contain two film camera heads 11L and 11R (note FIG. 2A) loaded with black and white film. Images 131L and 131R are recorded on each film. In an optical processor the image 131L is projected through a red filter treating the red image 132L and the image 131R is projected through a cyan filter, creating the cyan image 132R. The images 132L and 132R are recorded superimposed in a color film camera.

When the color film is projected on movie screen 7, the picture 8 is perceived. This picture is nearly identical to the picture 8 of the previously described TV system except for differences in color reproduction between TV and film. Stereoscopic glasses 9 and what they do are as described above.

FIG. 13 is a schematic diagram of a limited (two) color anaglyph television system. The stereoscopic television camera 2 comprises two black and white camera heads 11L and 11R. In front of the lens 12L (not shown) of the camera head 11L is a red filter 133L and in front of the lens 12R (not shown) of the camera head 11R is a cyan filter 133R. The densities of the filters 133L and 133R are different, so that the white (W) chip will appear in 30% luminosity in an image 131L and white will appear in 70% luminosity in an image 131R. The densities of these filters are similar to those associated with the red and blue plus green pick-up tubes of a conventional color TV camera.

The camera head 11L creates the electronic image 131L of the stereo-pair in different tones of black, white, and gray than the tones in which camera head 11R creates image 131R.

The electronic images of 131L and 131R of the camera 2 are electronically connected to the left and right inputs of the black and white encoder 4 as shown in FIG. 6. The left and right gain controls 41L and 41R are AGC circuits which electronically maintain the signal levels of the left and right images.

The color coder 42L electronically colors the left image 132L red and the color coder 42R electronically colors the right image 132R cyan. If two color camera heads are used, such as in FIG. 2, the filters 133L and 133R and the color coders 42L and 42R are not required as separate units. In this case, appropriate filters are built into the color camera heads. Electronic images 131L and 131R are similar to electronic images 132L and 132R because color coding takes place within the camera heads 11L and 11R. The blue and green outputs of the camera head 11R are tied together.

The images 132L and 132R are superimposed in the superimposer 43 (FIG. 6). The resulting picture 8 is displayed on the color TV receiver 7. The picture 8 appears in limited (two) colors because the red image 132L is superimposed on the cyan image 132R and each of the images contains different color information. However, blue and green objects both appear in the same tone of cyan. Both blue sky and green apples appear to have the same color, namely cyan.

The glasses 9 have filters with different densities. A red filter 140L transmits 30% luminosity for red (R) and white (W) chips. A cyan filter 140R transmits 70% luminosity for cyan (C) and white (W) chips. The images 103L and 103R are mentally superimposed into a composite picture 112 which is a limited color reproduction of test chart 130.

If the system of FIG. 13 were a limited (two) color anaglyph film system, the film camera 2 would contain two film camera heads 11L and 11R loaded with black-and-white film and with a red filter in front of the lens 12L and a cyan filter in front of the lens 12R. In an optical processor the image 131L is projected through a red filter creating a red image 132L, and the image 131R is projected through a cyan filter creating a cyan image 132R. Images 132L and 132R are superimposed and recorded in a color film camera. When the color film is projected on the movie screen 7, the picture 8 is perceived through tne glasses 9 as being in limited (two) colors.

FIG. 14 is a schematic diagram of a full (three) color anaglyph television system. Stereoscopic television camera 2 comprises three black and white camera heads 11L, 11R1 and 11R2. The camera head 11L picks-up the left image of the stereo-pair of images of scene 1. The camera heads 11R1 and 11R2 utilize optical means of the nature of the alternate configuration of FIG. 2A to pick up two images of scene 1 from the same point of view, which together represent the right image of the stereo-pair.

In front of lens 12L (not shown) of camera head 11L is a red filter 133L; in front of lens 12R1 (not shown) of camera head 11R1 is a blue filter 133R1; and in front of lens 12R2 (not shown) of camera head 11R2 is a green filter 133R2. The densities of the filters 133L, 133R1 and 133R2 are different, so that the white (W) chip appears in 30% luminosity in image 131L, 11% luminosity in image 131R1 and 59% luminosity in image 131R2. The densities of these filters are similar to those associated with the red, green and blue pick-up tubes of a conventional color TV camera.

The camera head 11L creates an electronic image 131L, the camera head 11R creats an electronic image 131R1 and the camera head 11R2 creates an electronic image 131R2. Each of these three images is picked-up in different tones of black, white and gray.

The left electronic image 131L is connected to the left input of the color encoder 4. The right electronic images 131R1 and 131R2 are connected to the right inputs of the color encoder 4 as shown in FIG. 6A. The gain controls 44R, 44B and 44G (FIG. 6A) preferably are AGC circuits which electronically maintain the signal levels.

Color coders such as 42L and 42R of FIG. 6 are not required as separate units in the encoder 4 because the camera 2 is essentially a color television camera with the red tube optically separated so as to obtain a stereo-pair of images. Appropriate filters conventionally are built into the color camera heads. The color camera 2 provides RGB outputs which are superimposed and encoded by the NTSC encoder 45 of FIG. 6. FIG. 2 illustrates a configuration where two identical color cameras are used with the red output of the right camera head 11R deactivated and the blue and green outputs of the left camera head 11L deactivated. The resulting picture 8 is displayed on the color TV receiver 7. The picture 8 appears in full (three) color because varying luminosity values of each of the three primary colors are presented, thus providing a wide spectrum of hues. The glasses 9 have filters with different densities. Red filter 140L transmits 30% luminosity for red (R) and white (W) chips. Cyan filter 140R transmits 70% luminosity for cyan (C) and white (W) chips. Filter 140R also transmits 11% luminosity for blue (B) and 59% luminosity for green (G) chips. The images 103L and 103R are mentally superimposed into a composite picture 112 which is a full color reproduction of test chart 130.

If the system of FIG. 14 were a full (three) color anaglyph film system, the film camera 2 would contain three film camera heads 11L, 11R1 and 11R2, loaded with black and white film and with a red filter in front of lens 12L, a blue filter in front of lens 12R1, and a green filter in front of lens 12R2. In an optical processor, the image 131L is projected through a red filter creating a red image 132L, the image 131R1 is projected through a blue filter creating a blue image 132R1, and the image 131R2 is projected through a green filter creating a green image 132R2. Images 132L, 132R1, and 132R2 are superimposed and recorded in a color film camera. When the color film is projected on a movie screen 7, the picture 8 is perceived through glasses 9 as being in full (three) color. Instead of black and white film and filters in front of the lenses of the camera heads 11L, 11R1 and 11R2 color film could be used in these camera heads. The same procedure described above is used in the optical processor.

FIG. 15 is a more detailed functional electrical block diagram of a black-and-white anaglyph stereoscopic video encoder 4. During initial experimentation a resistive matrix was used to create the red, green and blue electrical values from the left and right monochrome input signals. These signals were fed to an NTSC encoder. Several problems were encountered in using this system. The Y, I and Q matrices used in the NTSC encoder made it impossible to get a pure chroma vector that had the cancellation needed for separating the left and right images. Also, the luminance (Y level) had to be reduced to a level where the separation could be accomplished, thus increasing noise. Further, the output of the initial decoder represented the full tonal range from red to cyan and thus, intermediate areas were displayed as hues of blue and magenta, or with alternate coefficients, yellow and green. Finally, this approach to an encoder design made it impossible to produce a red image with an illuminous value greater than 30% of peak white.

Another method tested was that of a "compatible" 3D system, wherein one of the stereo-pair of signals was encoded fully into chromance, having no luminous value, and the other signal had only the luminous characteristic. This does produce a useable (although dim) image. The difficulty encountered during recording and playback of the signal was that the Q vector was more susceptible to noise because of its reduced amplitude. The I vector also suffered, but not to the same degree. A marginally acceptable noisy picture resulted.

The encoder 4 of FIG. 15 is a practical system which substantially overcomes these difficulties. The requirements established are, (1) maximize the luminous content of the total signal to reduce the effects of noise, (2) equalize the bandwidths of luminous signals to minimize unwanted colored fringing, and (3) produce only red and cyan vectors and no intermediate vectors which would produce interemediate hues.

The system of FIG. 15 includes the following features. It has a variable luminance matrix disassociated from the color matrix. A differential color matrix separates the L-R and R-L signals. A slicer separates subtractive and additive signals and applies them to separate modulators. Fully variable modulators allow encoding for any hue or vector. It provides luminance band reduction.

The encoder has been set-up for subjective testing so that the system could be optimized. The matrix values and hues were varied to minimize "ghosting" (crosstalk) or lack of separation between left and right eye images, and coloration of color additive and substractive areas. The code coefficients and values found to be effective are tabulated below.

| ELECTRONIC CHARACTERISTICS | RED (L) | CYAN (R) |
| --- | --- | --- |
| Luminance Coefficient | 0.42 | 0.58 |
| Color Difference Coefficient | 1.00 | 1.00 |
| Encoded Vector Angle | 350° | 170° |
| Maximum Chroma Amplitude (shown as % of peak white) | 63% | 70% |

The black and white stereoscopic encoder 4 of FIG. 15 has a left monochrome image signal input and a right monochrome image signal input applied to blanking and clamp circuits 180L and 180R respectively. These two circuits are connected to a summing circuit 181 in which the Y coefficient is adjusted by circuit 181A The single output from the circuit 181 passes through low pass filter 182, sync adder 183 and a delay circuit 184. The output of the delay circuit is the output of the encoder 4 and fs a composite anaglyph signal.

A portion of the signals from blanking and clamp circuits 180L and 180R is applied to clamp circuits 185L and 185R. These clamp circuits 185L and 185R have black balance adjust circuits 186L and 186R respectively. The black balance circuits 186L and 186R are adjusted to provide a conventional black balance of the two signals. The output of the clamp 185L passes through an inverter 187. The output of inverter 187 and clamp 185R are connected to a summing circuit 188. Circuit 188 is affected by white balance adjust control 189. White balance circuit 189 is adjusted to provide the conventional white balance of the two signals. The output of circuit 188 goes into a slicer 190. The L-R output thereof is connected to a modulator 191L with left amplitude adjust 192L. The R-L output of the slicer 190 is connected to a modulator 191R with right amplitude adjust 192R. The outputs of the modulators 191L and 191R are connected together and are applied through a bandpass filter 193 to combine with the signal from the delay circuit 184 and, thus, become part of the composite anaglyph output signal.

A sub-carrier signal from the TV camera control unit is applied to the encoder 4 and is connected to a phase shift circuit 194R which has a right (cyan) hue adjust control 195R, and a phase shift circuit 194L which has a left (red) hue adjust control 195L. The right hue and left hue adjust controls 195R and 195L are set to produce the desired color. The output of the phase shift circuit 194L is connected to another input of the modulator 191L, and the output of the phase shift circuit 194R is connected to another input of the modulator 191R. The amplitude controls 192L and 192R are set so that the amplitude of each signal is essentially equal. The output of the encoder 4 is an encoded signal, and if this signal is examined on a vectorscope, it will be seen that the left hand image produces a strong peak at 350° and the right hand image produces a strong peak at 170°. The encoder 4 of FIG. 15 is similar to the encoder 4 of FIG. 6. However, in FIG. 6 the various boxes are portrayed and described in terms of function; whereas, FIG. 15 sho more detailed electronic circuitry.

FIG. 16 is a more detailed functional electrical block diagram of the color stereoscopic video encoder 4A. The left image input signal is applied to a decoder 170L, and the right input signal is applied to a decoder 170R. A white balance manual adjust control 171 is set to obtain a 6500° K. color temperature output for encoder 4A. A color temperature automatic adjust control 172 receives a reference color temperature input signal from the decoder 170R and automatically monitors and adjusts the decoder 170L to maintain the white balance color temperature manually selected (e.g., 6500° K) by the white balance manual circuit 171.

The decoders 170L and 170R have RGB (red, green, and blue) outputs. The R, G and B outputs of the decoder 170L are not used when a 2D/3D switch 174 is in the 2D position and in this case the R output of the decoder 170R is connected to the R input of a NTSC encoder 173. The G and B outputs of the decoder 170R are directly connected to G and B inputs of the NTSC encoder 173. As will be apparent, the resulting composite signal output from the TSC encoder 173 is a two dimensional picture composed only of the right image signal.

On the other hand, if 2D/3D switch is in the 3D position, the R output of the decoder 170L is connected to the R input of the NTSC encoder 173. The G and B outputs of decoder 170R remain directly connected to the G and B inputs of the NTSC encoder 173. The output of the encoder 173 then is a composite anaglyph signal with the red component representing the left image signal and the blue and green components representing the right image signal. The manual white balance control 171 and the color tmeperature 172 assure that the white balance color temperature of this composite signal is correct.

It should be noted that with dual video recorder 3 and optional recorder 5 a stereoscopic television system uses three video tape recorders and these are computer controlled in a conventional manner. FIG. 5 illustrated the dual video recorder 3 which contains video tape recorder 38L with the left image video tape 39L and video tape recorder 38R with the right image video tape 39R. The output of recorders 38L and 38R may be played back through the color encoder 4A and recorded on anaglyphic stereoscopic video recorder 5. As previously mentioned, the original stereoscopic video or film recording may include scenes in which the cameraman misadjusted the horizontal convergence control or vertically misaligned the stereo-pair of images. As the video tapes are played back by recorders 38L and 38R, the composite anaglyph signal output of encoder 4A may be viewed with glasses 9 directly on a TV monitor 7. The stereoscopic picture 8 may be found misregistered. For this reason, two other circuits are provided in the encoder 4A of FIG. 16 to enable the operator to adjust the horizontal and vertical convergence of the two images. These are a gen lock circuit 175 (synch generator) and a convergence circuit 176. The outputs from these two circuits provide a reference signal to the left VTR 38L and a reference signal to the right VTR 38R. The signal from 175 provides sync to the left VTR 38L. The reference signals from 176 enable the operator, via manual horizontal and vertical controls 176A to separately adjust the horizontal convergence and the vertical registration of the picture. The images may be viewed on a monitor in a rehearsal mode and later recorded on the video recorder 5. Where desirable, the vertical and horizontal manual controls 176A can be combined into a single "joy stick".

Figure 17:
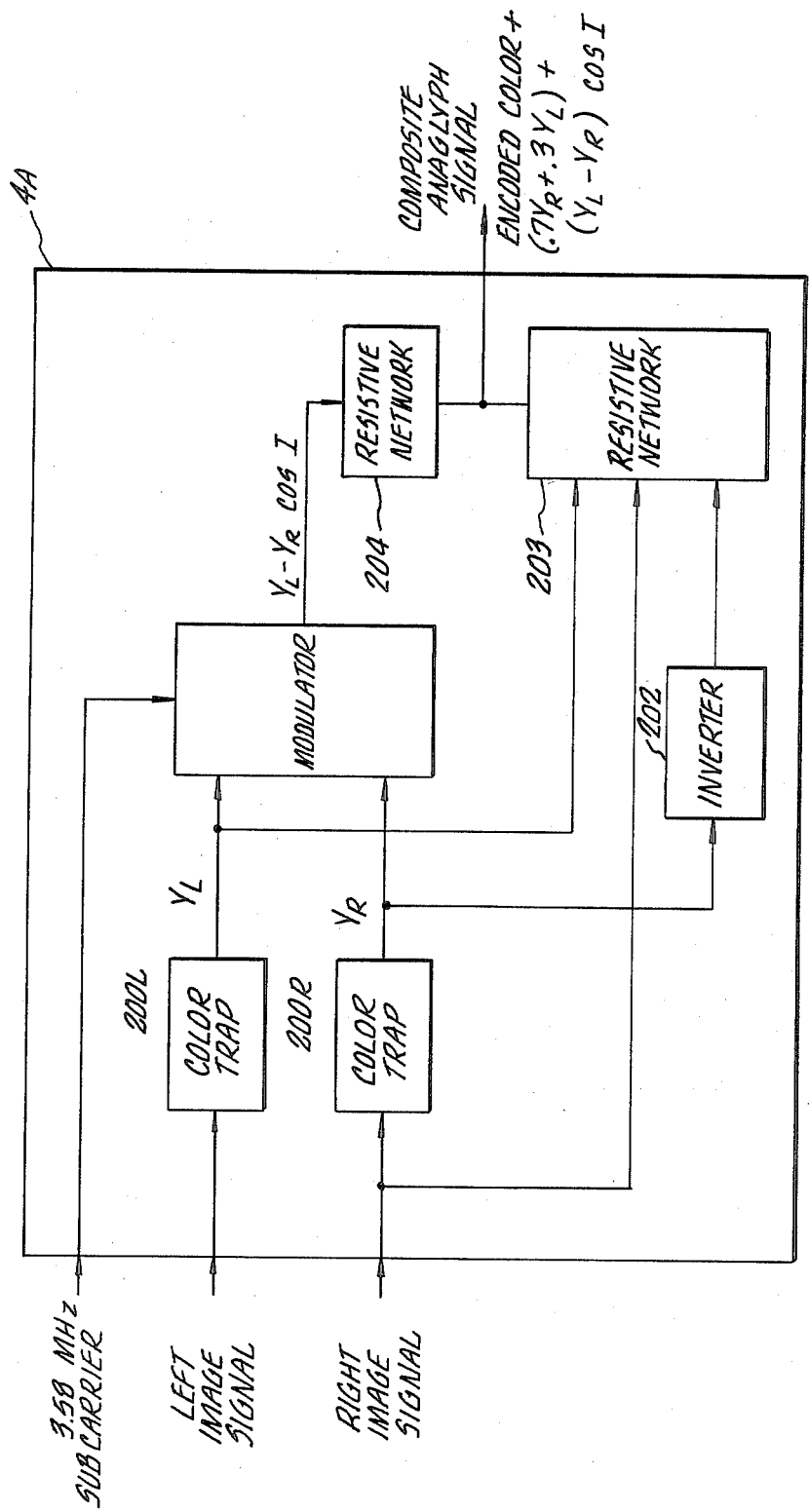
FIG. 17 is a detailed block diagram of an alternate embodiment of the encoder of FIG. 6A.

FIG. 17 is an alternate functional electrical block diagram of the color stereoscopic video encoder 6A. The left image input signal is applied to a color trap 200L and the right input signal is applied to a color trap 200R. The output of the color trap 200L is a signal $Y_L$ and the output of the color trap 200R is a signal $Y_R$. The signals $Y_L$ and $Y_R$ are fed into a modulator 201. Also connected to the modulator 201 is a 3.58 MhZ sub-carrier signal from the television camera control (not shown). The modulator 201 provides an output signal $(Y_L - Y_R) \cos I$ which is connected to a resistive network 204.

A portion of the signal $Y_R$ from the color trap 200R is connected to an inverter 202. The output signal of the inverter 202, plus a portion of the output signal $Y_L$ from color trap 200L and a portion of the right image signal are connected to resistive network 203. The outputs of the resistive networks 203 and 204 combine and provide as an output an ENCODED COLOR $+(0.7\ Y_R+0.3\ Y_L)+(Y_L-Y_R) \cos I$ signal which is the composite anaglyph signal.

The functional difference between the color encoder of 4A of FIG. 17 and the color encoder 4A in FIG. 16 is evident in the 3D areas (fringes) of picture 8. The make-up of these fringes in encoder 4A of FIG. 16 is represented by "$(RED_L-(GREEN_R+BLUE_R)) \cos I$". The fringes of encoder 4A of FIG. 17 are represented by $(IY_L - Y_R) \cos I$. The advantages of FIG. 17 are that (1) the ghosting (that is, the leakage of the images one into the other, causing a portion of each image to be seen by the wrong eye) is reduced, and (2) the resolution of the fringe area is increased, thereby heightening the stereoscopic effect.

It will be understood that equivalents and alternatives which do not depart from the spirit of the invention will be apparent from the teachings hereof to those skilled in the art. It is therefore to be understood that each of these alternatives and equivalents which do not depart from the spirit of the invention are intended to be included herein.

What is claimed is:

1. A stereoscopic pictorial system using a stereo-pair of images and a stereo-pair of standard video signals to produce a stereoscopic video signal, comprising dual pickup means for picking up said stereo-pair of images and for providing said stereo-pair of standard video signals, said stereo-pair of standard video signals including a first standard video signal having a first luminance signal and a second standard video signal having a second luminance signal, subcarrier means for generating a television subcarrier signal, differencing means for determining the difference between the first luminance signal and the second luminance signal, modulating means for modulating the television subcarrier signal with the difference between the first and second luminance signals to produce a stereoscopic difference signal, and encoding means for encoding the stereoscopic difference signal with the first standard video signal to produce said stereoscopic video signal.

2. A system as in claim 1 including
    converting means for converting the stereoscopic video signal into a pair of colored images wherein one of the pair of colored images is of a first color and the other of the pair of colored images is of a second and third distinct colors.

3. A system as in claim 2 including
    means for conveying the pair of colored images to a display means, and
    said display means for displaying the pair of colored images.

4. A system as in claim 3 including
    anaglyph means for allowing the pair of displayed colored images to be separate for perception by a viewer, and wherein the anaglyph means includes one filter substantially of the first color and a second filter substantially of a color corresponding to a combination of the second and third distinct colors.

5. A stereoscopic pictorial system using a stereo-pair of images and a stereo-pair of standard color matrixed signals to produce a stereoscopic video signal, comprising dual pickup means for picking up said stereo-pair of images and for providing said stereo-pair of standard color matrixed signals, said stereo-pair of standard color matrixed signals including a first standard color matrixed signal having a first luminance signal and a second standard color matrixed signal having a second luminance signal, subcarrier means for generating a television subcarrier signal, differencing means for determining the difference between the first luminance signal and the second luminance signal, modulating means for modulating the television subcarrier signal with the difference between the first and second luminance signals to produce a stereoscopic difference signal, and encoding means for encoding the stereoscopic difference signal with the first standard color matrixed signal to produce said stereoscopic video signal.

6. A system as in claim 5 including
    converting means for converting the stereoscopic video signal into a pair of colored images wherein one of the pair of colored images is of a first color and the other of the pair of colored images is of a second and third distinct colors.

7. A system as in claim 6 including
    means for conveying the pair of colored images to a display means, and
    said display means for displaying the pair of colored images.

8. A system as in claim 7 including
    anaglyph means for allowing the pair of displayed colored images to be separate for perception by a viewer, and wherein the anaglyph means includes one filter substantially of the first color and a second filter substantially of a color corresponding to a combination of the second and third distinct colors.

9. A method of providing a stereoscopic pictorial system using a stereo-pair of images and a stereo-pair of standard video signals to produce a stereoscopic video signal comprising the steps of
   detecting said stereo-pair of images,
   generating said stereo-pair of standard video signals, said stereo-pair of standard video signals including a first standard video signal having a first luminance signal and a second standard video signal having a second luminance signal,
   generating a television subcarrier signal,
   determining the difference between the first luminance signal and the second luminance signal,
   modulating the television subcarrier signal with the difference between the first and second luminance signals to produce a stereoscopic difference signal, and
   encoding the stereoscopic difference signal with the first standard video signal to produce said stereoscopic video signal.

10. A method as in claim 9 including the step of converting the stereoscopic video signal into a pair of colored images wherein one of the pair of colored images is of a first color and the other of the pair of colored images is of second and third distinct colors.

11. A method as in claim 10 including the steps of conveying the pair of colored images to a display, and displaying the pair of colored images in said display.

12. A method as in claim 11 including the step of anaglyph separation of the pair of displayed colored images for perception by a viewer wherein said anaglyph separation is accomplished by use of one filter substantially of the first color and a second filter substantially of a color corresponding to a combination of the second and third distinct colors.

* * * * *